US012026733B2

(12) United States Patent
Sacco et al.

(10) Patent No.: US 12,026,733 B2
(45) Date of Patent: *Jul. 2, 2024

(54) SYSTEM AND METHOD FOR REAL-TIME PROMOTIONAL DEMAND MANAGEMENT UTILIZING MOBILE E-COMMERCE SALES LEADS

(71) Applicant: ByteDance Inc., Wilmington, DE (US)

(72) Inventors: Marcus Sacco, Chicago, IL (US); Shafiq Shariff, Chicago, IL (US); Jadam Kahn, Chicago, IL (US); Mike Aparicio, Chicago, IL (US); Joe Banks, Chicago, IL (US); Logan Tyler Jennings, Chicago, IL (US); Sergey Varaksin, Chicago, IL (US); Dmitrii Abramov, Chicago, IL (US); Artem Ignatyev, Chicago, IL (US); Tanya Koshy, Chicago, IL (US); Nathan Koch, Chicago, IL (US)

(73) Assignee: ByteDance Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,036

(22) Filed: Nov. 8, 2021

(65) Prior Publication Data

US 2022/0122102 A1    Apr. 21, 2022

Related U.S. Application Data

(63) Continuation of application No. 16/574,762, filed on Sep. 18, 2019, now Pat. No. 11,188,932, which is a (Continued)

(51) Int. Cl.
*G06Q 30/0202* (2023.01)

(52) U.S. Cl.
CPC ............... *G06Q 30/0202* (2013.01)

(58) Field of Classification Search
CPC ............... G06Q 30/0201; G06Q 30/02; G06Q 30/0202; G06Q 30/0205; G06Q 10/0637;
(Continued)

(56) References Cited

U.S. PATENT DOCUMENTS

| 6,058,371 A | 5/2000 | Djian |
| 6,067,525 A | 5/2000 | Johnson et al. |

(Continued)

FOREIGN PATENT DOCUMENTS

| CA | 2594001 C | 9/2019 |
| CN | 2594001 Y | 12/2003 |

(Continued)

OTHER PUBLICATIONS

U.S. Appl. No. 16/574,762, filed Sep. 18, 2019, U.S. Pat. No. 11,188,932, Issued.

(Continued)

*Primary Examiner* — Scott L Jarrett
(74) *Attorney, Agent, or Firm* — ALSTON & BIRD LLP

(57) ABSTRACT

A method, apparatus and computer program product are provided for mobile location based sales lead identification. Sales lead information may be provided based on a reference location, such as a sales resource real time location. Additional location information, demand information, competitive information, activity history, follow-up tasks, sales resource ownership information and past promotions relating to a particular sales lead may be additionally provided. The mobile location based sales lead information may allow a sales resource to efficiently manage their time during and in between sales visits, and prepare effective sales pitches to sales leads.

16 Claims, 14 Drawing Sheets

Related U.S. Application Data continuation of application No. 13/927,742, filed on Jun. 26, 2013, now abandoned.

(58) Field of Classification Search
CPC ......... G06Q 10/06375; G06Q 30/0203; G06Q 30/0605; G06Q 30/00; G06Q 10/06; G06Q 10/087; G06F 16/29

See application file for complete search history.

(56) References Cited

U.S. PATENT DOCUMENTS

| | | |
|---|---|---|
| 6,850,895 B2 | 2/2005 | Brodersen et al. |
| 6,922,672 B1 | 7/2005 | Hailpern et al. |
| 6,937,994 B1 | 8/2005 | Iyengar |
| 7,092,929 B1 | 8/2006 | Dvorak et al. |
| 7,240,025 B2 | 7/2007 | Stone et al. |
| 7,340,410 B1 | 3/2008 | Vaillancourt et al. |
| 7,487,117 B1 | 2/2009 | Tamura et al. |
| 7,647,255 B2 | 1/2010 | Wang et al. |
| 7,720,708 B1 | 5/2010 | Elkins et al. |
| 7,725,366 B1 | 5/2010 | Franco |
| 7,769,628 B2 | 8/2010 | Mathews et al. |
| 7,917,387 B2 | 3/2011 | Spurr et al. |
| 8,001,058 B1 | 8/2011 | Harding et al. |
| 8,010,404 B1 | 8/2011 | Wu et al. |
| 8,019,744 B1 | 9/2011 | Roizen et al. |
| 8,027,871 B2 | 9/2011 | Williams et al. |
| 8,135,607 B2 | 3/2012 | Williams et al. |
| 8,200,521 B2 | 6/2012 | Hader |
| 8,214,238 B1 | 7/2012 | Fairfield et al. |
| 8,249,942 B2 | 8/2012 | Mesaros |
| 8,311,896 B2 | 11/2012 | Mesaros |
| 8,478,650 B2 | 7/2013 | Ridley et al. |
| 8,533,038 B2 | 9/2013 | Bergh et al. |
| 8,600,843 B2 | 12/2013 | Bachman et al. |
| 8,725,597 B2 | 5/2014 | Mauseth et al. |
| 9,330,357 B1 | 5/2016 | Ferdowsi |
| 9,378,511 B2 | 6/2016 | Chafle et al. |
| 9,563,900 B1 | 2/2017 | Guo et al. |
| 10,108,974 B1 | 10/2018 | Shariff et al. |
| 10,147,104 B1 | 12/2018 | Gregory et al. |
| 10,282,766 B2 | 5/2019 | Rellas et al. |
| 10,395,276 B1 | 8/2019 | Fulghum |
| 10,475,083 B1 | 11/2019 | Nkengla et al. |
| 10,504,126 B2 | 12/2019 | Kulkarni et al. |
| 10,989,889 B2 | 4/2021 | Douglas et al. |
| 11,188,932 B2 * | 11/2021 | Sacco ................. G06Q 30/0202 |
| 2001/0032128 A1 | 10/2001 | Kepecs |
| 2001/0039514 A1 | 11/2001 | Barenbaum et al. |
| 2002/0042739 A1 | 4/2002 | Srinivasan et al. |
| 2002/0052820 A1 | 5/2002 | Gatto |
| 2002/0082892 A1 | 6/2002 | Raffel et al. |
| 2002/0099678 A1 | 7/2002 | Albright et al. |
| 2002/0138340 A1 | 9/2002 | Ikezawa et al. |
| 2002/0169654 A1 | 11/2002 | Santos et al. |
| 2002/0198756 A1 | 12/2002 | Ghaisas et al. |
| 2003/0046191 A1 | 3/2003 | Ferreri et al. |
| 2003/0065603 A1 | 4/2003 | Aihara et al. |
| 2003/0204498 A1 | 10/2003 | Lehnert |
| 2003/0220830 A1 | 11/2003 | Myr |
| 2004/0039624 A1 | 2/2004 | Ikezawa et al. |
| 2004/0093296 A1 | 5/2004 | Phelan et al. |
| 2004/0098467 A1 | 5/2004 | Dewey et al. |
| 2004/0143473 A1 | 7/2004 | Tivey et al. |
| 2005/0055275 A1 | 3/2005 | Newman et al. |
| 2005/0060242 A1 | 3/2005 | Armstrong et al. |
| 2005/0096963 A1 | 5/2005 | Myr et al. |
| 2005/0187818 A1 | 8/2005 | Zito et al. |
| 2005/0222886 A1 | 10/2005 | Sridharan |
| 2005/0251440 A1 | 11/2005 | Bednarek |
| 2005/0261951 A1 | 11/2005 | Tighe |
| 2005/0267828 A1 | 12/2005 | Baron et al. |
| 2006/0041500 A1 | 2/2006 | Diana et al. |
| 2006/0047559 A1 | 3/2006 | Jacoby et al. |
| 2006/0161534 A1 | 7/2006 | Carson et al. |
| 2006/0212355 A1 | 9/2006 | Teague et al. |
| 2006/0242039 A1 | 10/2006 | Haggerty et al. |
| 2006/0287946 A1 | 12/2006 | Toms |
| 2007/0015518 A1 | 1/2007 | Winter et al. |
| 2007/0016508 A1 | 1/2007 | Lapointe et al. |
| 2007/0050276 A1 | 3/2007 | Mannion |
| 2007/0067267 A1 | 3/2007 | Ives |
| 2007/0087831 A1 | 4/2007 | Van et al. |
| 2007/0168131 A1 | 7/2007 | Root et al. |
| 2007/0299743 A1 | 12/2007 | Staib et al. |
| 2008/0021844 A1 | 1/2008 | Sanwal et al. |
| 2008/0154654 A1 | 6/2008 | Niessen et al. |
| 2008/0177615 A1 | 7/2008 | Chen-Ritzo et al. |
| 2008/0256061 A1 | 10/2008 | Chang et al. |
| 2008/0270209 A1 | 10/2008 | Mauseth et al. |
| 2008/0281756 A1 | 11/2008 | Riise et al. |
| 2008/0281858 A1 | 11/2008 | Aleksiejczyk et al. |
| 2008/0288481 A1 | 11/2008 | Zeng et al. |
| 2008/0294996 A1 * | 11/2008 | Hunt ................... G06Q 30/02 707/999.102 |
| 2008/0306781 A1 | 12/2008 | Gerlach et al. |
| 2008/0306812 A1 | 12/2008 | Bowen et al. |
| 2008/0313018 A1 | 12/2008 | Kamm et al. |
| 2009/0024402 A1 | 1/2009 | Delingat et al. |
| 2009/0048859 A1 | 2/2009 | McCarthy et al. |
| 2009/0119258 A1 | 5/2009 | Petty |
| 2009/0177540 A1 | 7/2009 | Quatse |
| 2009/0276296 A1 | 11/2009 | Spriegel |
| 2009/0281818 A1 | 11/2009 | Li et al. |
| 2010/0042496 A1 | 2/2010 | Wang et al. |
| 2010/0050201 A1 | 2/2010 | Kubota et al. |
| 2010/0082410 A1 | 4/2010 | Baudin et al. |
| 2010/0082413 A1 | 4/2010 | Huberman et al. |
| 2010/0082442 A1 | 4/2010 | Ma et al. |
| 2010/0082697 A1 | 4/2010 | Gupta et al. |
| 2010/0094693 A1 | 4/2010 | Corke |
| 2010/0138273 A1 | 6/2010 | Bateni et al. |
| 2010/0179704 A1 | 7/2010 | Ozog |
| 2010/0211455 A1 | 8/2010 | Williams et al. |
| 2010/0257012 A1 | 10/2010 | Walker et al. |
| 2011/0015999 A1 | 1/2011 | Vassilvitskii et al. |
| 2011/0029382 A1 | 2/2011 | Narasimhan et al. |
| 2011/0040655 A1 | 2/2011 | Hendrickson |
| 2011/0087531 A1 | 4/2011 | Winters et al. |
| 2011/0112892 A1 | 5/2011 | Tarantino |
| 2011/0112897 A1 | 5/2011 | Tietzen et al. |
| 2011/0173059 A1 | 7/2011 | Benson |
| 2011/0184873 A1 | 7/2011 | Wilson et al. |
| 2011/0219073 A1 | 9/2011 | Lawler et al. |
| 2011/0225023 A1 | 9/2011 | Evens et al. |
| 2011/0231321 A1 | 9/2011 | Milne |
| 2011/0246255 A1 | 10/2011 | Gilbert et al. |
| 2011/0246260 A1 | 10/2011 | Gilbert et al. |
| 2011/0246274 A1 | 10/2011 | Mesaros |
| 2011/0246306 A1 | 10/2011 | Blackhurst et al. |
| 2011/0258067 A1 * | 10/2011 | Rowell ................. G06Q 30/06 705/26.2 |
| 2011/0289106 A1 | 11/2011 | Rankin et al. |
| 2011/0307506 A1 | 12/2011 | Kass et al. |
| 2011/0313840 A1 | 12/2011 | Mason et al. |
| 2012/0010931 A1 | 1/2012 | Mehra et al. |
| 2012/0036009 A1 | 2/2012 | Aronowich et al. |
| 2012/0053987 A1 | 3/2012 | Satyavolu et al. |
| 2012/0054001 A1 | 3/2012 | Zivkovic et al. |
| 2012/0054019 A1 | 3/2012 | Kitts et al. |
| 2012/0054020 A1 | 3/2012 | Jacobs |
| 2012/0066393 A1 * | 3/2012 | Tekwani ................ H04W 4/20 709/226 |
| 2012/0078721 A1 | 3/2012 | Dakka et al. |
| 2012/0084119 A1 | 4/2012 | Vandehey et al. |
| 2012/0109751 A1 | 5/2012 | Binenstock et al. |
| 2012/0123851 A1 | 5/2012 | Bax et al. |
| 2012/0123863 A1 | 5/2012 | Kaul et al. |
| 2012/0179476 A1 | 7/2012 | Muncy |
| 2012/0203708 A1 | 8/2012 | Psota et al. |
| 2012/0246015 A1 | 9/2012 | Bennett et al. |
| 2012/0259705 A1 | 10/2012 | Monteverde |
| 2012/0271660 A1 | 10/2012 | Harris et al. |
| 2012/0278154 A1 | 11/2012 | Lange et al. |

(56) References Cited

U.S. PATENT DOCUMENTS

| | | |
|---|---|---|
| 2012/0291087 A1 | 11/2012 | Agrawal |
| 2012/0323634 A1 | 12/2012 | Harper et al. |
| 2012/0330720 A1 | 12/2012 | Pickton et al. |
| 2012/0330772 A1 | 12/2012 | Choe et al. |
| 2013/0006916 A1 | 1/2013 | McBride et al. |
| 2013/0013345 A1 | 1/2013 | Wallquist et al. |
| 2013/0013404 A1 | 1/2013 | Suprock et al. |
| 2013/0030872 A1* | 1/2013 | Oksman ............ G06Q 30/02 705/7.36 |
| 2013/0036069 A1 | 2/2013 | Salloum et al. |
| 2013/0046574 A1 | 2/2013 | Griep et al. |
| 2013/0054369 A1 | 2/2013 | Grigg et al. |
| 2013/0060635 A1 | 3/2013 | Walker et al. |
| 2013/0066885 A1 | 3/2013 | Komuves |
| 2013/0073381 A1 | 3/2013 | Binkley |
| 2013/0073387 A1 | 3/2013 | Heath |
| 2013/0080239 A1 | 3/2013 | Okerlund |
| 2013/0101110 A1 | 4/2013 | Haughey |
| 2013/0103634 A1 | 4/2013 | Jojic et al. |
| 2013/0124259 A1 | 5/2013 | Chourey et al. |
| 2013/0159319 A1 | 6/2013 | Duan et al. |
| 2013/0179264 A1 | 7/2013 | Wilson |
| 2013/0185147 A1 | 7/2013 | Letca et al. |
| 2013/0197675 A1 | 8/2013 | McCarthy et al. |
| 2013/0246176 A1 | 9/2013 | Chang et al. |
| 2013/0262171 A1 | 10/2013 | Solodko et al. |
| 2013/0282509 A1 | 10/2013 | Strong et al. |
| 2013/0290172 A1 | 10/2013 | Mashinsky |
| 2013/0311271 A1 | 11/2013 | Agrawal et al. |
| 2013/0346157 A1 | 12/2013 | Avrilionis et al. |
| 2013/0346981 A1 | 12/2013 | Johnson et al. |
| 2014/0019249 A1 | 1/2014 | Nicholas et al. |
| 2014/0025467 A1 | 1/2014 | Nagarajan et al. |
| 2014/0032261 A1 | 1/2014 | Kotak |
| 2014/0143100 A1 | 5/2014 | Glustrom et al. |
| 2014/0207533 A1 | 7/2014 | Gregg |
| 2014/0279058 A1 | 9/2014 | Mullins et al. |
| 2015/0073906 A1 | 3/2015 | Chauhan et al. |
| 2015/0088610 A1 | 3/2015 | Bayles et al. |
| 2015/0120407 A1 | 4/2015 | Deshpande et al. |
| 2015/0142516 A1 | 5/2015 | Schwans et al. |
| 2015/0149091 A1 | 5/2015 | Milton et al. |
| 2016/0212266 A1 | 7/2016 | Soundar |
| 2016/0314399 A1 | 10/2016 | Mullins et al. |
| 2020/0082418 A1* | 3/2020 | Sacco ............ G06Q 30/0202 |

FOREIGN PATENT DOCUMENTS

| | | |
|---|---|---|
| WO | 2008/113042 A1 | 9/2008 |
| WO | 2012/122362 A2 | 9/2012 |
| WO | 2013/106123 A1 | 7/2013 |

OTHER PUBLICATIONS

U.S. Appl. No. 13/927,742, filed Jun. 26, 2013, 2015/0019287, Abandoned.

"CMPT 125: Lecture 1: Understanding the Computer" Tamara Smyth School of Computing Science, Simon Fraser University Jan. 3, 2009.

"Credit rating analysis with support vector machines and neural networks: a market comparative study" Zan Huanga, Hsinchun Chena, Chia-Jung Hsua, Wun-Hwa Chenb, Soushan Wu 0167-9236/03/$—see front matter 2003 Elsevier B.V. All rights reserved. doi:10.1016/S0167-9236(03)00086-1.

"Forecasting Corporate Revenue and Profit: Time-Series Models Versus Management and Analysts" David A. Kodde and Hein Schreuder Journal of Business Finance & Accounting, 11 (3), Autumn 1984, 0306686 x $2.50.

"Forecasting Corporate Revenue and Profit: Time-Series Models Versus Management and Analysts" David A. Kodde and Hein Schreuder Journal of Business Finane & Accounting, 11 (3), Autumn 1984, 0306686 x $2.50.

"Fulfillment source allocation, inventory transshipment, and customer order transfer in e-tailing." Torabi S, Hassini E, Jeihoonian M, Transp Res Part E Logist Transp Rev 79:128-144 (Year: 2015).

"Support Vector Machine for Regression and Applications to Financial Forecasting" Theodore B. Trafalis and Huseyin Ince 0-7695-0619-4/00 $10.00 2000 IEEE.

"Support Vector Machine for Regression and Applications to Financial Forecasting" Theodore B. Trafalig and Huseyin Ince 0-7695-0619-4/00 $10.00 2000 IEEE.

Extended European Search Report For European Office Application No. 14818658.8 dated Dec. 9, 2016, 5 pages.

International Search Report and Written Opinion for Application No. PCT/US2014/020028 dated Jun. 6, 2014.

International Search Report and Written Opinion for Application No. PCT/US2014/44067 dated Nov. 14, 2014.

LGadTrack.com WGb Pag (Copyrights) s Lead Track, Feb. 2001, Retrieved from Archive.org Nov. 2007 (Year: 2001).

Marketsoft—eLeads Marketsoft.com, Feb. 2000, Retrieved from Archived.org Jun. 2006 (Year: 2000).

Mitigating spillover in online retailing via replenishment, Jason Acimovic, C Stephen, Graves, Manufacturing & Service Operations Management, vol. 19, issue 3, p. 419-436 (Year: 2015).

SalesLogix.com Web Pages Sales Logix, Apr. 2001, Retrieved from Archive.org Aug. 2005 (Year: 2001).

U.S. Application filed Apr. 30, 2012, entitled "Sales Enhancement System", U.S. Appl. No. 13/460,745.

U.S. Application filed Dec. 13, 2013, entitled "Method, Apparatus, and Computer Program Product for Providing a Search Feedback System", U.S. Appl. No. 14/106,203.

U.S. Application filed Mar. 14, 2013; In re: Richardson et al., entitled "Updating Routing Information Based on Client Location", U.S. Appl. No. 13/829,581.

U.S. Application filed Mar. 15, 2013 entitled "Pull-Type Searching System", U.S. Appl. No. 13/842,379.

U.S. Application filed Mar. 2, 2012; entitled "Relevance Systemfor Consumer Deals", U.S. Appl. No. 13/411,502.

U.S. Application filed Sep. 26, 2013; entitled "Automated Deal Guide Structure Identification", U.S. Appl. No. 14/038,629.

U.S. Application filed Sep. 27, 2013, entitled "Method, Apparatus, and Computer Program Product for Consumer Tracking", U.S. Appl. No. 14/039,473.

U.S. Appl. No. 13/803,445, filed Mar. 14, 2013; In re: Shariff et al., In re: Method, Apparatus, and Computer Program Product for Sales Pipeline Automation.

U.S. Provisional Application filed Apr. 26, 2012; entitled "Deal Meter", U.S. Appl. No. 61/639,067.

U.S. Provisional Application filed Apr. 26, 2012; entitled "Deal Meter"; U.S. Appl. No. 61/639,067, U.S. Appl. No. 61/639,067.

U.S. Provisional Application filed Aug. 13, 2012; entitled "Unified Payment and Return on Investment System", U.S. Appl. No. 61/682,762.

Wong, W., "Andrew Mason talks about Groupon's growth and growing up", Chicago Tribune, Business, (Sep. 8, 2012), pp. 1-3, Retrieved oniine at: http://articles.chicagotribune.com/2012-09-08/business/chi-andrew-mason-talks-about-groupons-growth-and-growing-up-20120908_1_deal-personalization-groupons-core-daily-deal-business.

Wong, W., (Sep. 8, 2012). Andrew Mason talks about Groupon's growth and growing up. The Chicago Tribune, pp. 1-3. http://articles.chicagotribune.com/2012-09-08/business/chi-andrew-mason-talks-about-groupons-growth-and-growing-up-20120908_1_deal-Personalization-groupons-core-daily-deal-business.

Konstadinos G. Goulias, Travel Behavior and Demand Analysis and Prediction, University of California Santa Barbara, Santa Barbara, CA, Jun. 2007. (Year: 2007).

Kusum L. Ailawadi, Bari A. Harlam, Jacques Cesar, David Trounce, Promotion Profitability for a Retailer: the Role of Promotion, Brand, Category, and Store Characteristics, Apr. 14, 2006. (Year: 2006).

E.M. Pemrick Company, Niche Marketing Plan: Village of Brewster, Niskayuna, NY, Mar. 2009. (Year: 2009).

Annex to the communication Mailed on Apr. 13, 2018 for EP Application No. 14818658, 6 page(s).

Annex to the communication Mailed on Aug. 20, 2019 for EP Application No. 14818658, 1 page(s).

(56) References Cited

OTHER PUBLICATIONS

Annex to the communication Mailed on Jul. 19, 2019 for EP Application No. 14818658, 15 page(s).
Annex to the communication Mailed on Mar. 6, 2019 for EP Application No. 14818658, 10 page(s).
Communication from the Examining Division Mailed on Apr. 13, 2018 for EP Application No. 14818658, 2 page(s).
European search opinion Mailed on Dec. 9, 2016 for EP Application No. 14818658, 2 page(s).
IPEA/409—International Preliminary Report on Patentability Mailed on Jan. 7, 2016 for WO Application No. PCT/US14/044067, 7 page(s).
IPEA/409—International Preliminary Report on Patentability Mailed on Sep. 24, 2015 for WO Application No. PCT/US14/020028, 7 page(s).
ISA/220—Notification of Transmittal or Search Report and Written Opinion of the ISA, or the Declaration Mailed on Jun. 6, 2014 for WO Application No. PCT/US14/020028, 1 page(s).
ISA/220—Notification of Transmittal or Search Report and Written Opinion of the ISA, or the Declaration Mailed on Nov. 14, 2014 for WO Application No. PCT/US14/044067, 1 page(s).
Outgoing—ISA/210—International Search Report and Written Opinion Mailed on Jun. 6, 2014 for WO Application No. PCT/US14/020028, 8 page(s).
Outgoing—ISA/210—International Search Report and Written Opinion Mailed on Nov. 14, 2014 for WO Application No. PCT/US14/044067, 7 page(s).
Supplementary European search report Mailed on Dec. 9, 2016 for EP Application No. 14818658, 1 page(s).

* cited by examiner

SYSTEM AND METHOD FOR REAL-TIME PROMOTIONAL DEMAND MANAGEMENT UTILIZING MOBILE E-COMMERCE SALES LEADS

CROSS REFERENCES TO RELATED APPLICATIONS

The present application is a continuation of and claims priority to U.S. patent application Ser. No. 16/574,762, filed Sep. 18, 2019, and titled, "METHOD, APPARATUS, AND COMPUTER PROGRAM PRODUCT FOR PROVIDING MOBILE LOCATION BASED SALES LEAD IDENTIFICATION," which is a continuation of and claims priority to U.S. patent application Ser. No. 13/927,742, filed Jun. 26, 2013, and titled, "METHOD, APPARATUS, AND COMPUTER PROGRAM PRODUCT FOR PROVIDING MOBILE LOCATION BASED SALES LEAD IDENTIFICATION," which is hereby incorporated by reference in its entirety.

The present application is related to U.S. patent application Ser. No. 13/803,445, filed Mar. 14, 2013, titled "METHOD, APPARATUS, AND COMPUTER PROGRAM PRODUCT FOR SALES PIPELINE AUTOMATION," which is hereby incorporated by reference in its entirety.

BACKGROUND

Various embodiments of the invention are related to promotional systems, and particularly to a method and apparatus for providing mobile, location based sales lead identification. Applicant has discovered problems with and related opportunities relating to sales resources efficiently managing identification of sales leads and managing communications with sales leads. Through applied effort, ingenuity, and innovation, Applicant has solved many of these identified problems by developing a solution that is embodied by the present invention, which is described in detail below.

BRIEF SUMMARY

A method, apparatus, and computer program product are therefore provided for providing mobile, location based sales lead identification.

A method is provided for mobile location based sales lead identification, the method comprising receiving a reference location indication based on at least one of a current location or an anticipated future location, wherein a geographical area is defined based on the reference location indication, one or more promotions and a demanded quantity of at least a portion of the one or more promotions, identifying one or more providers in the geographical area that are identified as able to supply at least a portion of the forecasted demand for the one or more promotions, and causing a display of provider information for each of the one or more providers, the provider information comprising a provider location indication, a promotion indication of a good or service and a promotion quantity suggested for each of the providers based on the forecasted demand.

In some embodiments, the provider information further includes at least one of a) an ownership indicator identifying a sales resource associated with the provider, b) contact information associated with the provider, c) activity history regarding the provider, d) a follow-up task to be performed regarding the provider, or e) demand information associated with the provider. The provider information may further comprises past promotion information associated with the provider, the past promotion information including at least one of a) a promotion date, b) a promotion cost and value, or c) units sold. The provider information further comprises competitive promotion information associated with the provider, the competitive promotion information including at least one of a) a promotion provider, b) a promotion cost and value, or c) units sold of the competitive promotion.

In some embodiments the method may further include receiving provider information relating to a new sales lead, saving the provider information as a new sales lead in the promotional system, and causing the displayed provider information to be updated to include the new sales lead.

In some embodiments, the method may include receiving follow-up information regarding a particular provider, the follow-up information provided by a sales resource and including at least one of a) a follow-up communication type, b) a follow-up date, saving the follow-up information in association with the particular provider, and causing the displayed provider information to be updated to include the follow-up information.

In some embodiments, the method may further include receiving a sale indication regarding a sale to a particular provider, updating demand information and provider information in a promotional system, and causing the displayed provider information to be updated to reflect the sale.

In some embodiments, the method may include receiving a request to sort the displayed provider information by at least a) distance of each respective provider from the reference location or b) a sales value associated with a provider, and causing the displayed provider information to be sorted based on the request. The sales value is calculated based on at least one of: expected bookings, a supply source score, a probability to close, or a time to close.

In some embodiments, a method is provided for mobile location based sales lead identification, the method including receiving a reference location indication based on at least one of a current location or an anticipated future location, wherein a geographical area is defined based on the reference location indication, display of provider information for each of the one or more providers, the provider information comprising a provider location indication, a promotion indication of a good or service and a promotion quantity suggested for each of the providers.

The method may further include calculating a forecasted demand for one or more promotions in the geographical area, the forecasted demand comprising at least one or more promotions and a demanded quantity of at least a portion of the one or more promotions, identifying one or more providers in the geographical area that are identified as able to supply at least a portion of the forecasted demand for the one or more promotions, and generating one or more current sales leads, wherein the current sales lead is indicative of a service or good offered by a provider of the one or more providers that is related to a demand service or a demanded good.

The provider information may further include at least one of a) an ownership indicator identifying a sales resource associated with the provider, b) contact information associated with the provider, c) activity history regarding the provider, d) a follow-up task to be performed regarding the provider, or e) demand information associated with the provider. In some embodiments, the provider information may include past promotion information associated with the provider, the past promotion information including at least one of a) a promotion date, b) a promotion cost and value, or c) units sold. In some embodiments, the provider information includes competitive promotion information associated with the provider, the competitive promotion information including at least one of a) a promotion provider, b) a promotion cost and value, or c) units sold of the competitive promotion.

In some embodiments, the method may further include receiving provider information relating to a new sales lead, saving the provider information as a new sales lead in the promotional system, and causing the displayed provider information to be updated to include the new sales lead, receiving follow-up information regarding a particular provider, the follow-up information provided by a sales resource and including at least one of a) a follow-up communication type, b) a follow-up date, saving the follow-up information in association with the particular provider, and causing the displayed provider information to be updated to include the follow-up information.

The method may further include receiving a sale indication regarding a sale to a particular provider, updating demand information and provider information in a promotional system, and causing the displayed provider information to be updated to reflect the sale, receiving a request to sort the displayed provider information by at least a) distance of each respective provider from the reference location or b) a sales value associated with a provider, and causing the displayed provider information to be sorted based on the request. In some embodiments, the sales value is calculated based on at least one of: expected bookings, a supply source score, a probability to close, or a time to close.

A method for mobile sales trip planning is provided, the method comprising receiving a reference location indication based on at least one of a current location or an anticipated future location, wherein a geographical area is defined based on the reference location indication, identifying, with a processor, one or more providers in the geographical area that are identified as having a current sales lead, generating a next provider indication, wherein the next provider indication provides a sales resource with a suggested next provided or the one or more providers to visit next based at least in part on proximity in the geographical area, and causing a display of provider information for a provider based on the next provider indication, the provider information comprising a provider location indication, a promotion indication of a good or service and a promotion quantity suggested for the provider.

The method may further include calculating a forecasted demand for one or more promotions in the geographical area, the forecasted demand comprising at least one or more promotions and a demanded quantity of at least a portion of the one or more promotions, identifying one or more providers in the geographical area that are identified as able to supply at least a portion of the forecasted demand for the one or more promotions, and generating one or more current sales leads, wherein the current sales lead is indicative of a service or good offered by a provider of the one or more providers that is related to a demand service or a demanded good.

The provider information may include at least one of a) an ownership indicator identifying a sales resource associated with the provider, b) contact information associated with the provider, c) activity history regarding the provider, d) a follow-up task to be performed regarding the provider, or e) demand information associated with the provider.

The provider information may further include past promotion information associated with the provider, the past promotion information including at least one of a) a promotion date, b) a promotion cost and value, or c) units sold. The provider information may include competitive promotion information associated with the provider, the competitive promotion information including at least one of a) a promotion provider, b) a promotion cost and value, or c) units sold of the competitive promotion.

In some embodiments the method may further include receiving provider information relating to a new sales lead, saving the provider information as a new sales lead in the promotional system, and causing the displayed provider information to be updated to include the new sales lead.

The method may further include receiving follow-up information regarding a particular provider, the follow-up information provided by a sales resource and including at least one of a) a follow-up communication type, b) a follow-up date, saving the follow-up information in association with the particular provider, and causing the displayed provider information to be updated to include the follow-up information. The method may further include receiving a sale indication regarding a sale to a particular provider, updating demand information and provider information in a promotional system, and causing the displayed provider information to be updated to reflect the sale.

The method may further include receiving a request to sort the displayed provider information by at least a) distance of each respective provider from the reference location or b) a sales value associated with a provider, and causing the displayed provider information to be sorted based on the request. The sales value may be calculated based on at least one of: expected bookings, a supply source score, a probability to close, or a time to close.

An apparatus is provided, the apparatus comprising at least one processor and at least one memory including computer program code, the at least one memory and the computer program code configured to, with the processor, cause the apparatus to at least receive a reference location indication based on at least one of a current location or an anticipated future location, wherein a geographical area is defined based on the reference location indication, one or more promotions and a demanded quantity of at least a portion of the one or more promotions, identify one or more providers in the geographical area that are identified as able to supply at least a portion of the forecasted demand for the one or more promotions, and cause a display of provider information for each of the one or more providers, the provider information comprising a provider location indication, a promotion indication of a good or service and a promotion quantity suggested for each of the providers based on the forecasted demand.

In some embodiments an apparatus is provided including at least one processor and at least one memory including computer program code, the at least one memory and the computer program code configured to, with the processor, cause the apparatus to at least, receive a reference location indication based on at least one of a current location or an anticipated future location, wherein a geographical area is defined based on the reference location indication, identify, one or more providers in the geographical area that are identified as having a current sales lead, and cause a display provider information for each of the one or more providers, the provider information comprising a provider location indication, a promotion indication of a good or service and a promotion quantity suggested for each of the providers.

In some embodiments an apparatus is provided comprising at least one processor and at least one memory including computer program code, the at least one memory and the computer program code configured to, with the processor, cause the apparatus to at least receive a reference location indication based on at least one of a current location or an anticipated future location, wherein a geographical area is defined based on the reference location indication, identify one or more providers in the geographical area that are identified as having a current sales lead, generate a next provider indication, wherein the next provider indication provides a sales resource with a suggested next provided or the one or more providers to visit next based at least in part on proximity in the geographical area, and cause a display of provider information for a provider based on the next provider indication, the provider information comprising a provider location indication, a promotion indication of a good or service and a promotion quantity suggested for the provider.

A computer program product is provided the computer program product comprising at least one non-transitory computer-readable storage medium having computer-executable program code instructions stored therein, the computer-executable program code instructions comprising program code instructions to receive a reference location indication based on at least one of a current location or an anticipated future location, wherein a geographical area is defined based on the reference location indication, calculate a forecasted demand for one or more promotions in the geographical area, the forecasted demand comprising at least one or more promotions and a demanded quantity of at least a portion of the one or more promotions, identify one or more providers in the geographical area that are identified as able to supply at least a portion of the forecasted demand for the one or more promotions, and cause a display of provider information for each of the one or more providers, the provider information comprising a provider location indication, a promotion indication of a good or service and a promotion quantity suggested for each of the providers based on the forecasted demand.

In some embodiments, a computer program product is provided comprising at least one non-transitory computer-readable storage medium having computer-executable program code instructions stored therein, the computer-executable program code instructions comprising program code instructions to receive a reference location indication based on at least one of a current location or an anticipated future location, wherein a geographical area is defined based on the reference location indication, identify one or more providers in the geographical area that are identified as having a current sales lead, and cause a display of provider information for each of the one or more providers, the provider information comprising a provider location indication, a promotion indication of a good or service and a promotion quantity suggested for each of the providers.

In some embodiments, a computer program product comprising at least one non-transitory computer-readable storage medium having computer-executable program code instructions stored therein, the computer-executable program code instructions comprising program code instructions to receive a reference location indication based on at least one of a current location or an anticipated future location, wherein a geographical area is defined based on the reference location indication, identify one or more providers in the geographical area that are identified as having a current sales lead, generate a next provider indication, wherein the next provider indication provides a sales resource with a suggested next provided or the one or more providers to visit next based at least in part on proximity in the geographical area, and location indication, a promotion indication of a good or service and a promotion quantity suggested for the provider.

DETAILED DESCRIPTION

Figure 1:
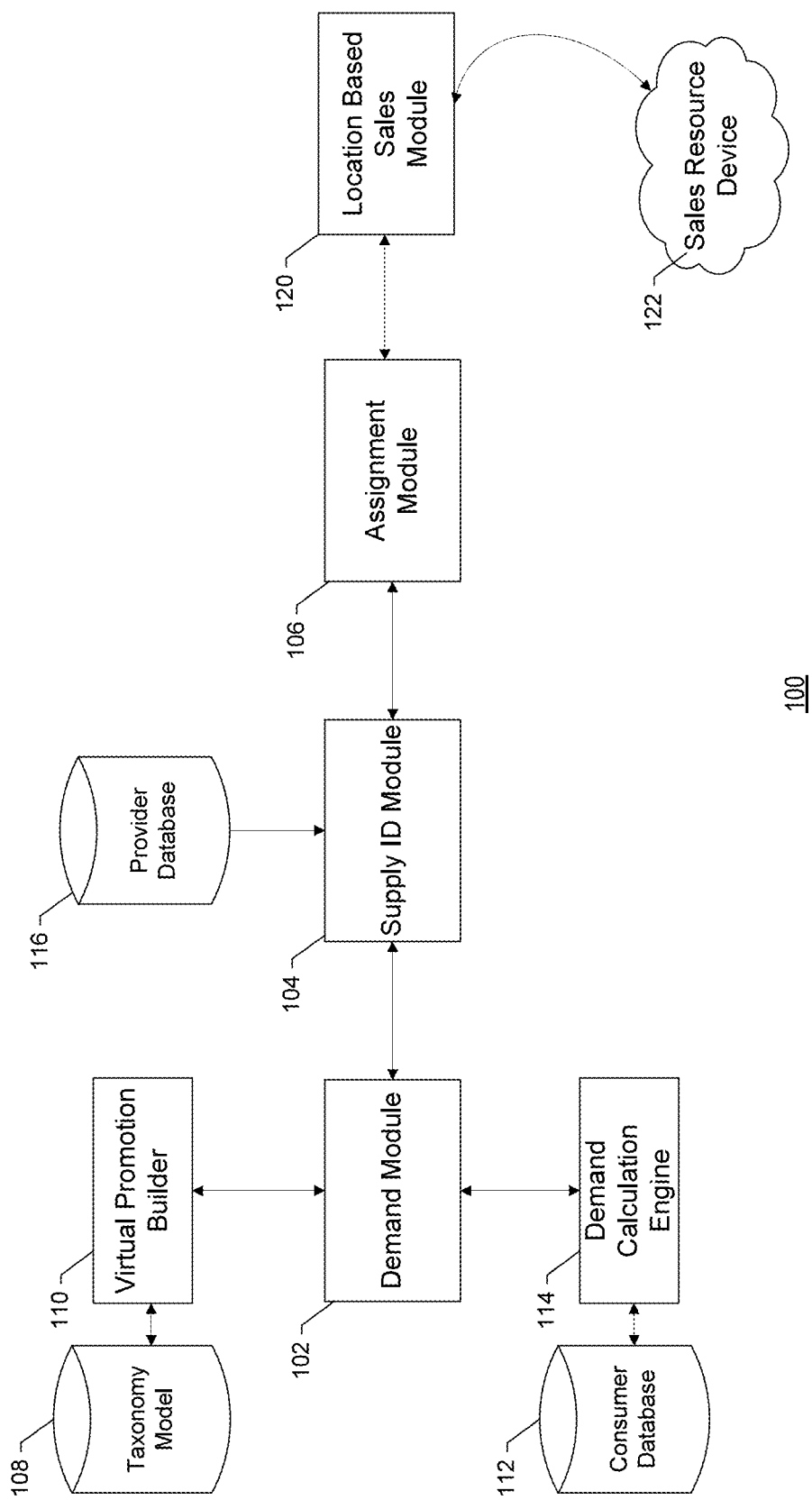
FIG. 1 is a is a schematic representation of a promotional system that may benefit from some example embodiments of the present invention, according to an example embodiment.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the other computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

Overview

In some example embodiments, the method, apparatus and computer program product described herein is configured to provide mobile, location based sales lead identification and/or lead assignments to sales resources of a promotion service. The mobile location based sales lead identification tool provides, in some example embodiments, efficient management of sales calls and/or visits to nearby sales leads, tracking of follow-up communications, sales lead planning, sales trip planning, day planning and/or the like. In some example embodiments, one or more sales leads may be provided to or otherwise generated by a promotional system for use by a promotion service (e.g., a service that provides promotion and/or marketing services on behalf of one or more providers that are offering one or more instruments that are redeemable for goods, services, experiences and/or the like by a consumer).

A sales lead may comprise an indication of a provider (e.g., a merchant, business owner, consigner, shopkeeper, tradesperson, vender, operator, entrepreneur, agent, dealer, organization or the like that is in the business of a providing a good, service or experience to a consumer, facilitating the provision of a goods, service or experience to a consumer and/or otherwise operating in the stream of commerce), and at least one of a provider category, a lead source, or historical data relating to the one or more providers. A sales lead may, in some embodiments, be generated or received from a third party system, based on a request from a provider and/or the like. The sales lead may include any of a provider name, an individual contact at the provider (e.g., manager, account manager, outside sales representative or the like), address, category and/or subcategory of the provider and/or services offered by the provider (such as food and drink, or salon services) and/or the like. Additionally or alternatively, in some example embodiments, the sales lead may include information regarding a promotion (e.g., any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion) with which to target the provider. As such, the sales lead may include a promotion specifically designed for the provider, or a provider may be specifically targeted to honor a preconceived promotion.

In some example embodiments, sales leads may be assigned to sales resources (e.g., salespersons), so that a designated sales resource may communicate with a provider and ultimately close a contract to offer a promotion and maintain a business relationship enabling future sales. In some examples, the sales resource may visit a provider's retail and/or office location to ensure face time with a provider, close a contract, maintain an ongoing business relationship, and/or the like. A sales resource may stop in a provider's place of business to discuss a current promotion, discuss the results of a past promotion and/or needs for future promotions. In some examples, various sales resources may work together (or in competition) in the same local area, but may, on occasion, perform sales visits on behalf of a colleague sales resource. As such, a sales resource may have the need for an effective tool for managing communications with sales leads, identifying sales leads assigned to other sales resources (e.g., viewing some or all sales leads owned by a particular sales resource(s)), planning one or more sales trips for efficiency (e.g., visiting all providers within a given geographical area such as a city block) and/or identifying unassigned or new sales leads while on the go.

By way of further example, FIG. 1 is a schematic representation of a promotional system that may benefit from some example embodiments of the present invention, according to an example embodiment. The promotional system may be utilized by a promotion service (that may include a business, organizational entity, or the like, who may partner with a providers to offer one or more instruments that are redeemable for goods, services, experiences and/or the like). As such, the promotional system may provide the promotion service means for identifying sales leads, assignment of the sales leads to sales resources, and effective communication from sales resource to sales lead, as described in further detail herein.

In general, the promotional system 100 may forecast or otherwise determine a demand for one or more promotions via the demand module 102. The demand illustrates and/or otherwise identifies promotions a consumer may be willing to purchase in a local area (e.g., category and/or sub category of a good, service or experience, a price, a location, a time, quantity of promotions, and/or the like). In some examples, the forecasted demand may be indicative of demanded promotions in the local area, however in other examples the demand may be indicative of a demanded good, service or experience in the local area irrespective of a promotion. In other examples, the demand forecast may be indicative of a sellout rate for a promotion, while in other examples a forecasted demand may be used to generate a predicted return on investment (ROI) for one or more merchants.

In order to facilitate the forecasted demand, the demand module 102 may be configured to generate one or more virtual promotions, such as via a taxonomy model 108 and/or a virtual promotion builder 110. Virtual promotions are representative of one or more promotions that could be offered in a local area. For example, $25 massages or $10 for $20 at a local clothing store. The taxonomy model 108 may describe a taxonomy or hierarchy of goods and services. For example, in a category defined as health and beauty, one or more services may be defined such as, but not limited to chiropractic, salon-skin, salon-massage and/or the like.

The virtual promotions may then be analyzed to determine the probabilities that a particular consumer, such as a current or past subscriber, would purchase the particular virtual promotion, such as via the demand calculation engine 114. The demand calculation engine 114 may be configured to generate or otherwise determine the probabilities based on for example past purchase history in a consumer database 112, historic demand for similar promotions, search engine results, survey results, current market trends and/or the like. Using the probabilities (e.g., the probability that each of a plurality of consumers would buy each of a plurality of virtual promotions), a forecasted demand may be generated.

In some example embodiments, the demand module 102 may adjust the forecasted demand based on factors, such as, but not limited to seasonality, economic conditions, holidays, weather and/or the like. For example, one or more ski resort promotions may be adjusted during the summer, one or more promotions during a holiday may be adjusted and/or the like. The demand module 102 may be configured to output a forecasted demand to the supply ID module 104.

In some example embodiments, supply identification (ID) module 104 may be configured to ingest the forecasted demand, adjusted demand or a combination thereof. Using the forecasted demand, the supply ID module 104 may be further configured to reduce or otherwise further modify the forecasted demand based on current offers in an inventory to determine a residual demand (e.g., one or more promotions that are needed to satisfy the forecasted demand in a local area).

Using the residual demand, the supply ID module 104 is configured to assign each promotion defined by the residual demand to one or more providers in an instance in which the provider is able to provide the same or similar goods, services and/or experiences as defined by the forecasted demand. In some examples, the one or more providers may be determined based on a global listing of providers stored in a provider database 116. As such, to the extent the provider provides a good, service or experience that matches or is related to a demanded promotion, the demanded offer may be assigned or otherwise linked to that provider. Each provider may therefore be assigned zero or more demanded offers as defined by the residual demand. As such, each demanded promotion may be assigned to zero or more providers, and sales lead, along with its respective demanded promotion may comprise a provider.

The supply ID module 104 may then further be configured to assign a sales value score to each of the providers and/or sales leads. In some examples, the sales value score may be determined according to one or more criteria, such as expected bookings, quality, risk, a time and/or probability to close a contract and/or the like. Based on the scores, the providers and/or sales leads may be prioritized and output to an assignment module 106. Using the sales value score, the supply ID module 104 may output a ranked list of sales leads to the assignment module 106. Alternatively or additionally, the supply ID module 104 may output one or more sales lead to one or more sales resources based on a previous assignment of a particular provider to a sales resource, the provider being in a geographical area that is assigned to a sales resource and/or the like.

In some example embodiments, the assignment module 106 may be configured to receive a ranked list of sales leads. Using the ranked list of providers, the assignment module 106 may further be configured to assign the sales leads in the ranked list of sales leads to one or more sales resources. The assignment module 106 may also be configured to re-prioritize and/or re-assign sales leads to sales resources according to a predetermined time period, such as daily, weekly or the like.

The assignment module 106 may also be configured to provide a prioritized sales lead list for one or more sales resources. In some examples, the prioritized list may be based on a current business objective, a portfolio mix, a priority, a commission and/or the like. In some examples, the sales lead list may be dynamically reprioritized based on current sales, a change in business objectives, an inventory change, a demand change and/or the like. In some example embodiments, the sales lead list may be dynamically reprioritized based on a current location or a planned location of a sales resource.

The assignment module 106 may also be configured to provide feedback and/or updates to one or more of the demand module 102, the supply ID module 104, the assignment module 106 or the like. The feedback and/or updates may be related to a contract being closed, time to close, a number of calls, a contact person or the like.

The assignment module 106 may be further configured to provide sales lead and assignment information to the location based sales module 120. In some examples, the location based sales module 120 may provide on-the-go; location based sales lead information to one or more sales resources via one or more sales resource devices 122. Various embodiments, example implementations, and uses of the location based sales module 120 are described in further detail herein (e.g., in FIGS. 2-6), while further description of the demand module 102, supply ID module 104 and assignment module 106 is provided in U.S. patent application Ser. No. 13/803, 445, which is incorporated by reference herein.

FIGS. 2A-2K and 3A-3K are example screen displays provided by the location based sales module 120, according to example embodiments described herein. The displays may be provided to sales resource devices 122 to provide on-the-go (i.e., mobile) sales lead identification and/or sales lead assignment and may also provide efficient communication and follow-up with sales leads. While described herein as providing functionality to mobile devices, it will be appreciated that the location based sales module 120 may additionally or alternatively be accessed from other types of computing devices and/or reports or other computer readable outputs of said computing devices.

Figure 2B:
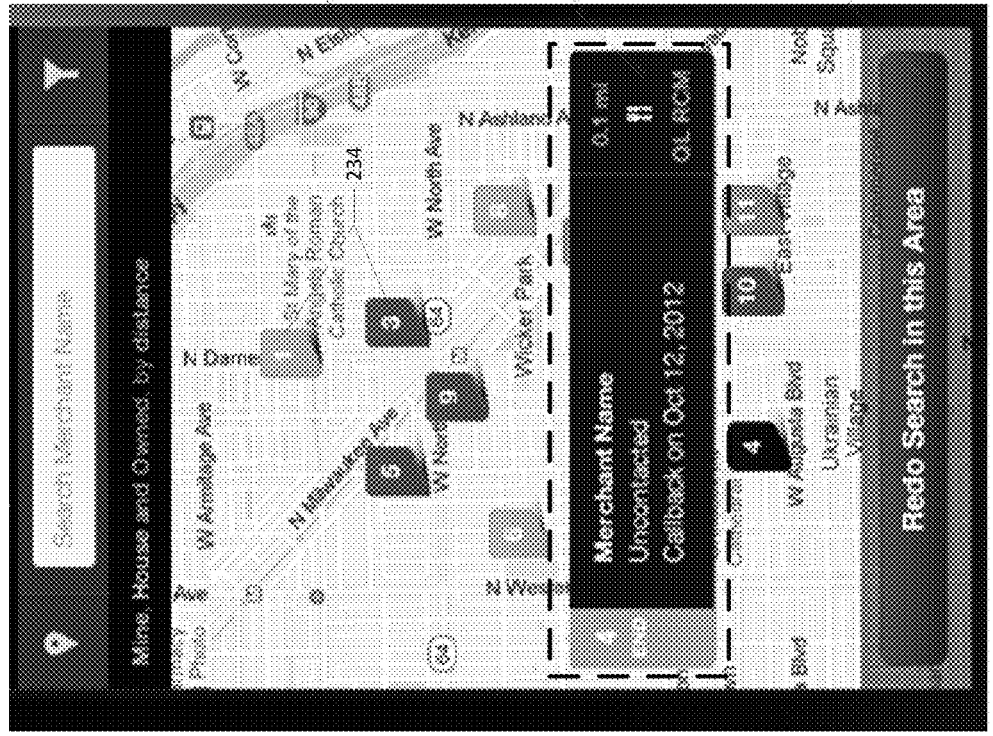
FIGS. 2A-2K and FIGS. 3A-3K are example screen displays according to example embodiments described herein.
Figure 2A:
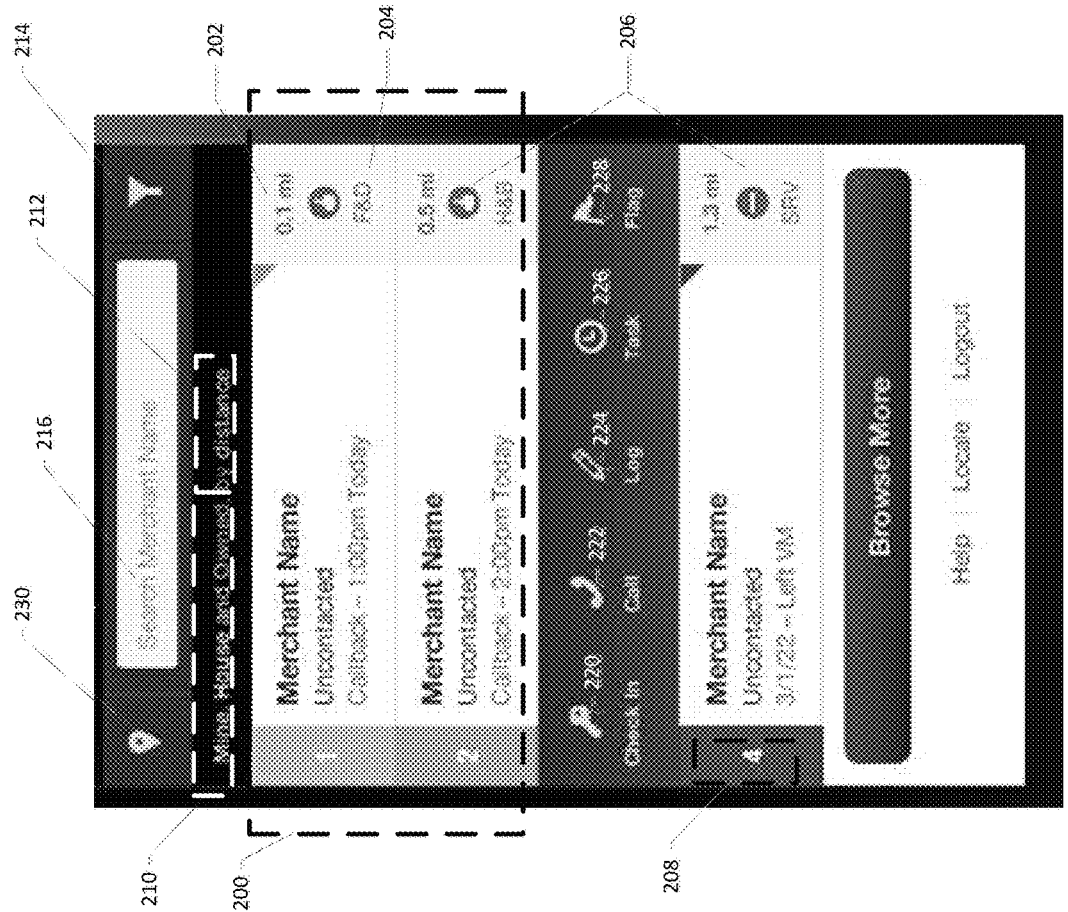

FIG. 2A is an example display provided by the location based sales module 120 which may be provided to a sales resource device 122. The location based sales module 120 may provide information regarding sales leads located nearby a reference location for use by the sales resource. In some embodiments, a reference location may be provided by the sales resource, such as for example, a location to which the sales resource plans to travel.

In some embodiments, the location based sales module 120 may detect a real time location of a user device by any number of methods. A global positioning system (GPS) operative on the sales resource device 122 may identify a real time location of the device, which may communicate the location to the location based sales module 120. Similarly, a cell tower triangulation process may be used to identify a real time location of the sales resource device 122, which may be transmitted to the location based sales module 120. Additionally, a real time location of a sales resource device 122 may be detected by use of a Wi-Fi access point. Once a sales resource device 122 detects a Wi-Fi access point, the sales resource device and/or location based sales module 120 may therefore identify the location of the sales resource device as the reference location.

Having received a reference location indication, the location based sales module 120 may determine or otherwise receive a geographic area indication based on the reference location indication. For example, the geographic area may be an area encompassed by a 10 mile radius of the reference location indication. Additionally or alternatively, predefined areas may be used for sales resource coverage of the sales leads. The location based sales module 120 may therefore provide a list of sales leads in the geographical area (e.g., sales leads associated with providers in close proximity to the reference location) as shown by indicator 200. Additionally or alternatively, providers having current sales leads and identified as being located in the identified geographic area may be provided. In some embodiments, pagination may be set to display a predefined number of sales leads, (e.g., 20 per page), and allow the sales resource to navigate page to page. The sales lead information may include a provider name, a status (e.g., uncontacted, visited, and/or called.) The sales lead information provided in the list may additionally or alternatively include a follow-up task which may include a communication type (e.g., "callback") and/or a date and time to complete the follow-up task. In some embodiments, the list may be sorted by distance, and may display the distance such as show by indicator 202. A category may be provided, such as by "F & D" (food and drink), "H & B" (health and beauty), or "SRV" (services), such as displayed at indicator 204. An indicator 206 may display a "thumbs up" symbol for a sales lead that the location based sales module 120 determines would be suitable for the sales resource to contact, or a "do not enter" symbol for those sales leads that the sales resource should not contact. In some embodiments the sales lead information may include a call priority and/or may be sorted by a call priority. Similarly, a visit priority may additionally or alternatively be provided. A sales resource may therefore sort the sales leads by visit priority to conveniently view the sales leads in the order the sales resource will visit the sales leads.

In the example display of FIG. 2A, the sales leads are color coded such as in area 208 to indicate ownership of the sales lead, such as "mine" (e.g., assigned to the user of the sales resource device 122), "house" (e.g., identified by the promotion service as a sales lead, but not assigned to a specific sales resource or assigned to internal sales), and/or "owned" (e.g., assigned to sales resource other than the user of the device). A corresponding color key is provided in area 210. The ownership labels may also be selectable to sort the list by any of the ownership types. In some embodiments, a sales resource may be above to claim a "house" sales lead (e.g., assign the sales lead to themself). A link such as provided at indicator 212 may provide for sorting by distance. Color coding by ownership type is provided merely as an example, and it will be appreciated that other visual distinctions may be made to indicate ownership type of a sales lead.

Figure 2D:
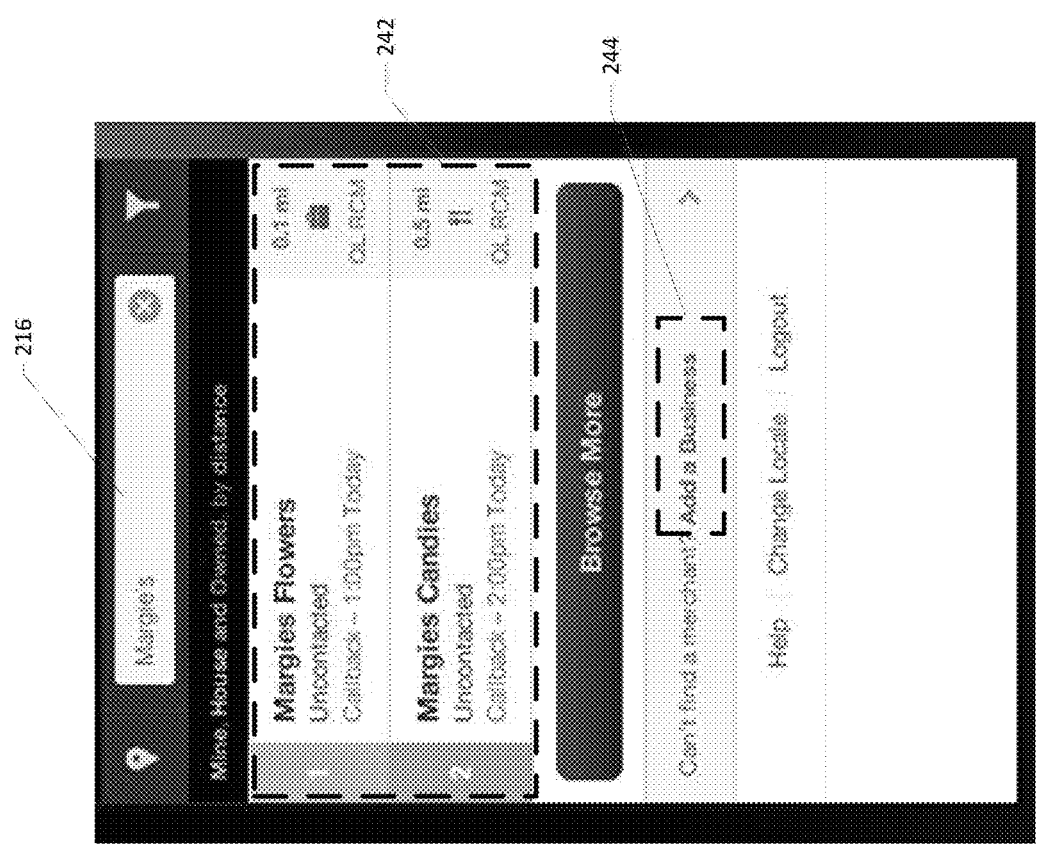
Figure 2C:
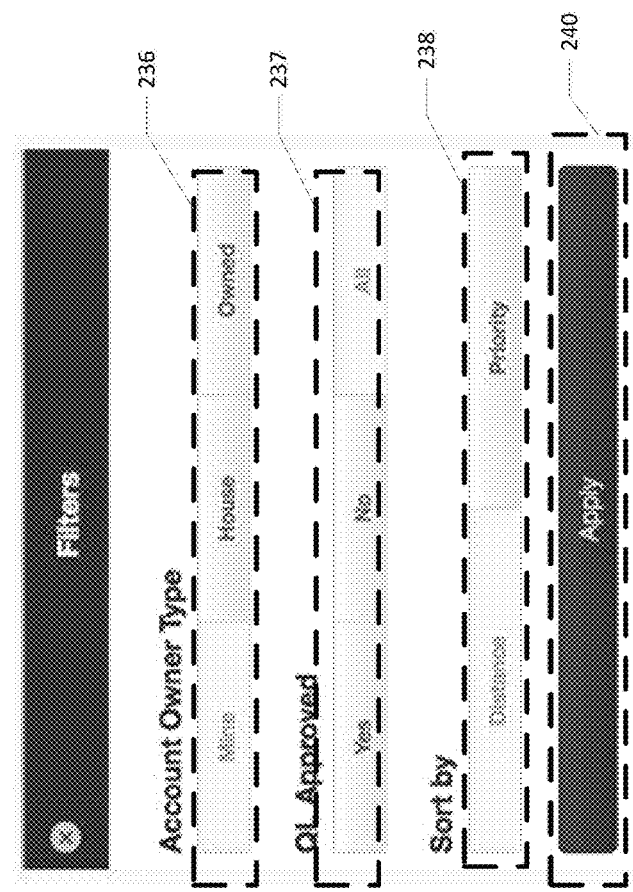

In some embodiments, a filter icon 214 may allow a sales resource to provide additional search and/or sort criteria, as described in further detail with respect to FIG. 2C. A search field 216 may additionally or alternatively be provided to allow a sales resource to manually enter a provider name and query the location based sales module 120 for additional information. Further detail regarding a manual search is provided with respect to FIG. 2D.

Check-in indicator 220 may be selected by a sales resource in order for the location based sales module 120 to log an activity indicating that the sales resource has personally visited the provider's place of business. The activity may be logged automatically, and/or the location based sales module 120 may prompt the sales resource for additional information, as described in further detail with respect to FIG. 2E. In some embodiments, upon selecting the check-in indicator 220, the sales resource may be provided with turn-by-turn directions to the provider's place of business.

Call indicator 222 may be provided, and selected by a sales resource wanting to call a contact associated with the sales lead. In some embodiments, the phone call may be initiated automatically following selection of call indicator 222. In some embodiments, a list of contacts associated with the sales lead may be presented to the sale resource for further selection. The outbound call may also be logged as an activity by the location base sales module 120, and associated to the sales lead in the promotional system. Other contact means may also be used after selection of the call indicator 222, such as, but not limited to a text message, an email, a push to talk request and/or the like. In some embodiments, a sales resource may be able to add new contact information and associated the contact information with a sales lead.

Figure 2F:
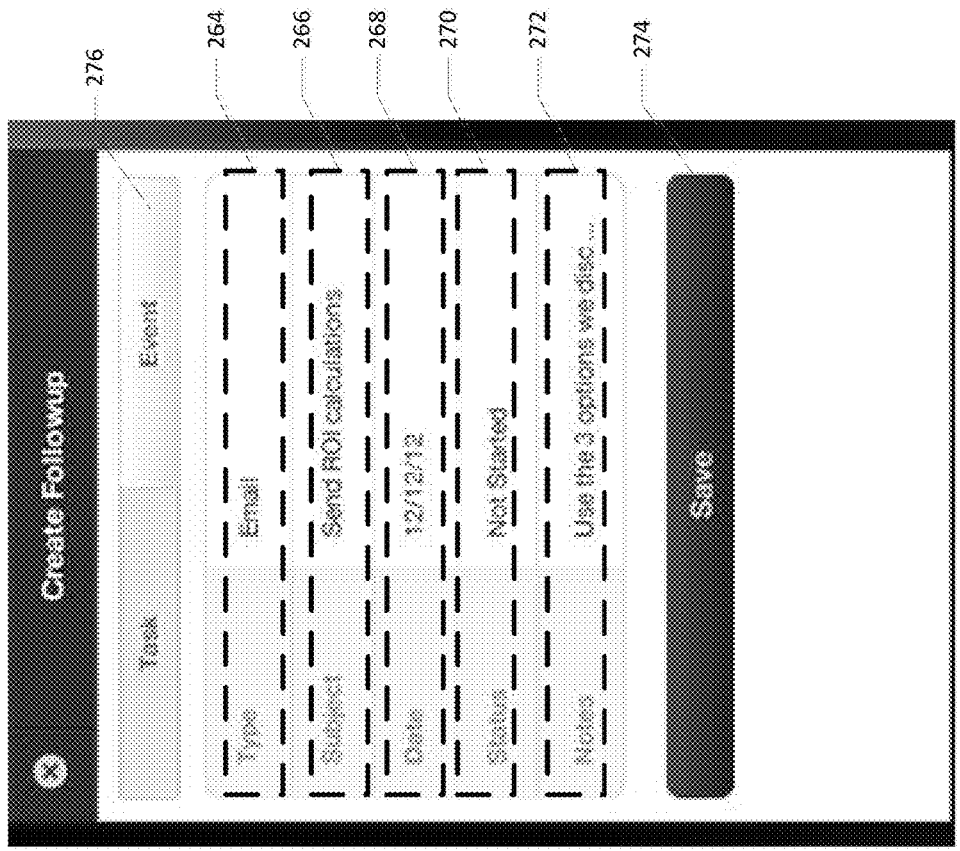
Figure 2E:
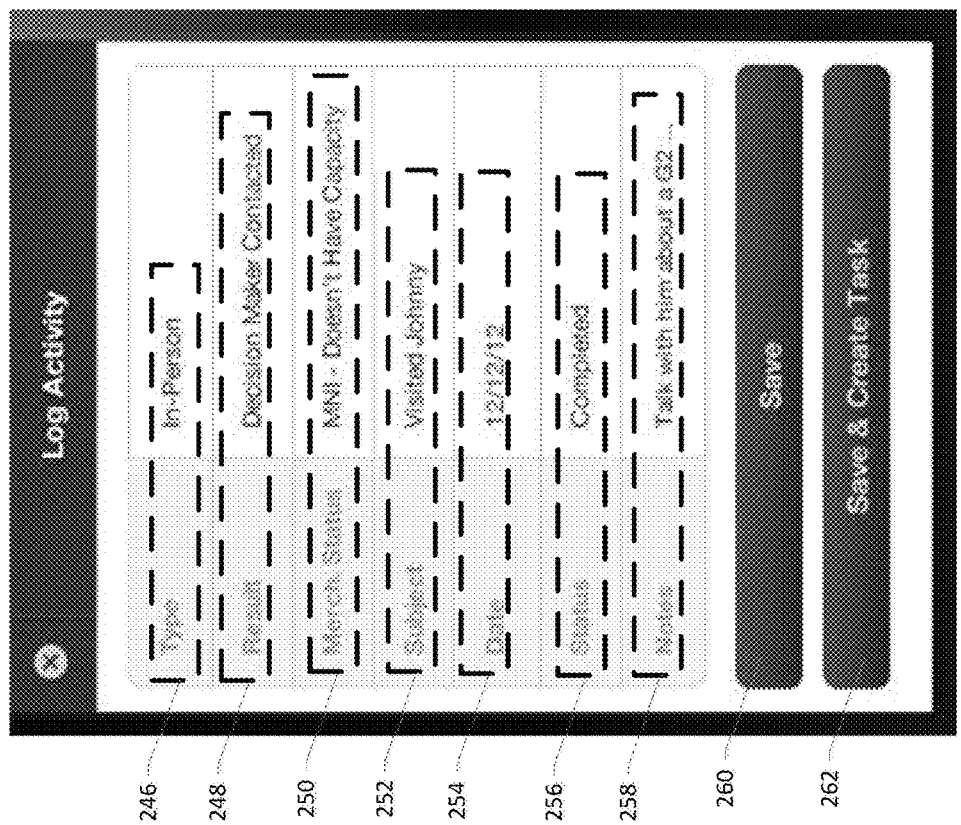

Log indicator 224 may allow a sales resource to manually provide activity log information, as described in further detail with respect to FIG. 2E.

Task indicator 226 may provide a sales resource with the ability to enter a follow-up task to be associated with the sales lead in the location based sales module 120. Follow-up tasks are described in further detail with respect to FIGS. 2F and 2G.

Figure 2H:
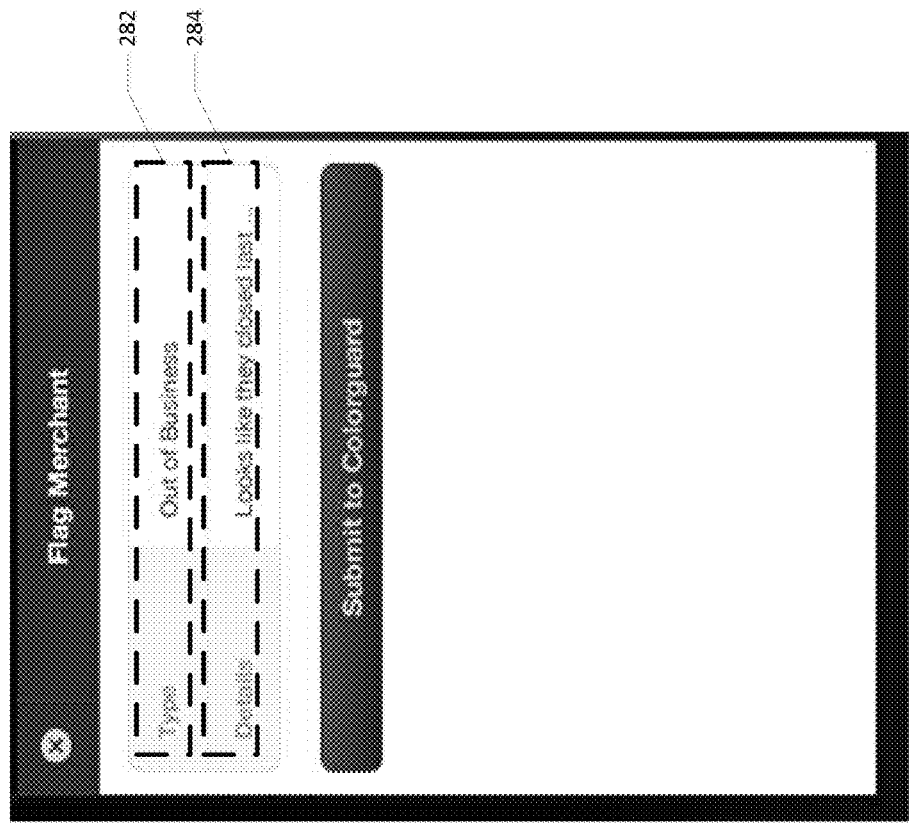

Flag indicator 228 may provide a sales resource the ability to flag a provider with special condition information, such as described in further detail with respect to FIG. 2H.

Map indicator 230 may allow a sales resource to switch the display from the list view of FIG. 2A to a map based display such as the display of FIG. 2B, which may provide a map based view of an area anywhere in the world.

The display of FIG. 2B may provide a map 232 based view of sales leads located nearby to a reference location (such as the sales resource's current real time location). The reference location may be visually indicated on the map (not shown). Sales lead indicators 234 may be displayed on the map to indicate the respective business locations, and may be color coded to match the color key in area 210 indicating sales lead ownership as shown in and described with respect to FIG. 2A. Selection of any one of the sales lead indicators 234 may result in the display of additional sales lead information, such as shown in area 236. Further selection of sales lead information in area 236 may cause the display of additional sales lead information and/or menus providing access to additional sales lead information, such as described in further detail hereinafter.

Indicator 238 may allow a sales resource to redo the search. The location based sales module 120 may therefore obtain a new reference location, and refresh the displayed sales leads and respective sales lead information. As such, map 232, indicators 234, and/or associated sales lead information may be updated to provide more current location information and/or sales lead information. Additionally or alternatively, a sales resource may filter sales leads displayed on the map (described with respect to filter icon 214 below), search for specific sales lead criteria and display the results on the map, and/or paginate the search results on the map (e.g., view the next 20 sales leads on the map). In some embodiments, an indicator may be provided (not shown) allowing a sales resource to reset the search criteria and/or filters to default settings (such as, for example, searching for sales leads within a particular geographic area).

FIG. 2C is an example display that may be provided by location based sales module 120 to enable search refinement and/or sorting, and may be accessed by selection of filter icon 214 of FIG. 2A, for example. Indicators 236 may allow filtering of the sale lead list to display or not display sales leads of ownership types "mine," "house," and "others," as described above with respect to FIG. 2A. As shown by indicators 237, in some embodiments, a sales resource may filter search results by whether or not the sales lead is "approved" (Yes) or "not approved (No)," indicating whether or not management or the like has approved a particular sales lead to be pursued with a sales pitch. Selecting "All" at indicator 237 may filter the search results to display both approved and non-approved sales leads. Additionally or alternatively, a sales resource may filter search results by category (e.g., food and drink, health and beauty, and/or the like), and/or based on whether the associated provider has offered a promotion with the promotion service and/or a competitor in the past.

Indicators 238 may provide a sales resource the option to sort the sales lead list by distance and/or priority. Sorting by priority may allow the sales resource to view the sales lead in order of a sales value score, a commission, a level of interest by the promotion and/or the like, for example. Search button 240 may allow the user to return to a list view and/or map based view such as those of FIGS. 2A and/or 2B, with any newly selected criteria or sorting being applied to the displayed sales leads.

FIG. 2D is an example display following a manual provider search. In the example display, a sales resource has entered "Margie's" in the search field 216. The location based sales module 120 may return matching sales lead and/or provider results for display in area 242. Additionally or alternatively, a sales resource may search by zip code, neighborhood and/or city which may result in sale leads and/or providers located in the zip code, neighborhood and/or city, and may be displayed in a list view and/or map view. In some embodiments, even if the search is initiated from a list view perspective, searching by a zip code, neighborhood, and/or city may cause the search results to be displayed in a map based display. Additionally or alternatively, a sales resource may draw a box on a map, and/or move the map to refocus the search area, so that the search is limited to the specified area on the map. A search limitation provided on a map may therefore define a geographic area in which to search for sales leads. In some embodiments, a sales resource may search by sales lead category, such as food and drink, health and beauty, and/or the like. Link 244 may provide a sales resource the ability to add a provider as a potential new sales lead, and provide additional information regarding the provider to the location based sales module 120. The newly provided sales lead information may be stored in the promotional system and assigned to the sales resource that entered the new sales lead. Alternatively or additionally the provided sales lead information may be included in the sales pipeline as is described with respect to FIG. 1.

In some embodiments, an indication of a next provider may be provided (not shown) to help a sales resource identify a next provider and/or sales lead the sales resource should visit. A sales resource may therefore quickly identify a next destination, following an unrelated appointment, for example, and access provider information and corresponding location information. The sales resource may then quickly navigate to the appropriate location and/or easily retrieve pertinent sales lead information as a refresher and/or to utilize in planning a sales pitch. Additionally or alternatively, a sale resource may create and/or save an itinerary in advance to use to navigate and plan appointments to visit various sales leads throughout the day.

Continuing to FIG. 2E, the display provided therein may be used by a sales resource to provide details regarding an activity to be logged and associated with a sales lead in the location based sales module 120. As such, a sales resource may utilize the activity log capabilities of the location based sales module 120 to track their communication and/or progress with a sales lead. The display of FIG. 2E may be provided, for example, following selection of the log indicator 224 of FIG. 2A. In some embodiments, an activity log display may be provided automatically following completion of a call, sending an SMS (short message service), email and/or the like. Some or all of the fields of display 2E may be prefilled based on known information, such as the contact information, call duration, and/or the like, from a previously initiated communication, and/or default settings configured by a sales resource. The activity log information may be provided as free-form text and/or drop downs providing selectable options.

The activity log information, may include, for example, a type of activity 246 (e.g., in-person visit, call, email, etc.), result 248 (e.g., "decision maker contacted"), merchant status 250 (e.g., "doesn't have capacity"), subject 252 (e.g., a brief description of the activity), date 254 (e.g., the date of the activity), status 256, and/or notes 258 (e.g., any additional information regarding the activity). In some cases a recommendation for future contact may be stored.

After providing the activity information, the sales resource may select to save the activity to the activity log by selecting save button 260 and/or 262 (which may also allow the sales resource to enter a follow-up task, as described in further detail with respect to FIG. 2F). Upon saving the activity, the activity information may be associated with the sales lead in location based sales module 120. As such, other users (e.g., sales resources, etc.) of the promotional system 100 may view the activity log associated with the sales lead. The activity log is described in further detail with respect to FIGS. 3F and 3G.

The display of FIG. 2F may allow a sales resource to enter a follow-up task to be associated with the sales lead in the location based sales module 120. The task information may include a follow-up type 264 (e.g., email, call, or in-person visit), subject 266 (e.g., brief description), date 268 (e.g., date by which to complete the task), status 270 (e.g., status of the task), and/or notes 272 (e.g., additional detail regarding the task). Upon selection of a save button 274, the follow-up task information may be saved and associated with the sales lead in the location based sales module 120. As such, other users (e.g., sales resources, etc.) of the promotional system 100 may view the follow-up task associated with the sales lead. Alternatively or additionally, the follow-up task or other notes from the sales resource may be used in generating a future score for the provider, such as a provider quality score, a merchant quality score and/or the like.

In some embodiments, the location based sales module 120 may sync the task to the sales resource's calendar, so that the sales resource may receive an alert warning the sales resource of an upcoming target completion date of a follow-up task. Additionally or alternatively, the location based sales module 120 may provide a sales resources with a listing of open follow-up tasks to be completed by the sales resource (not shown).

Figure 2G:
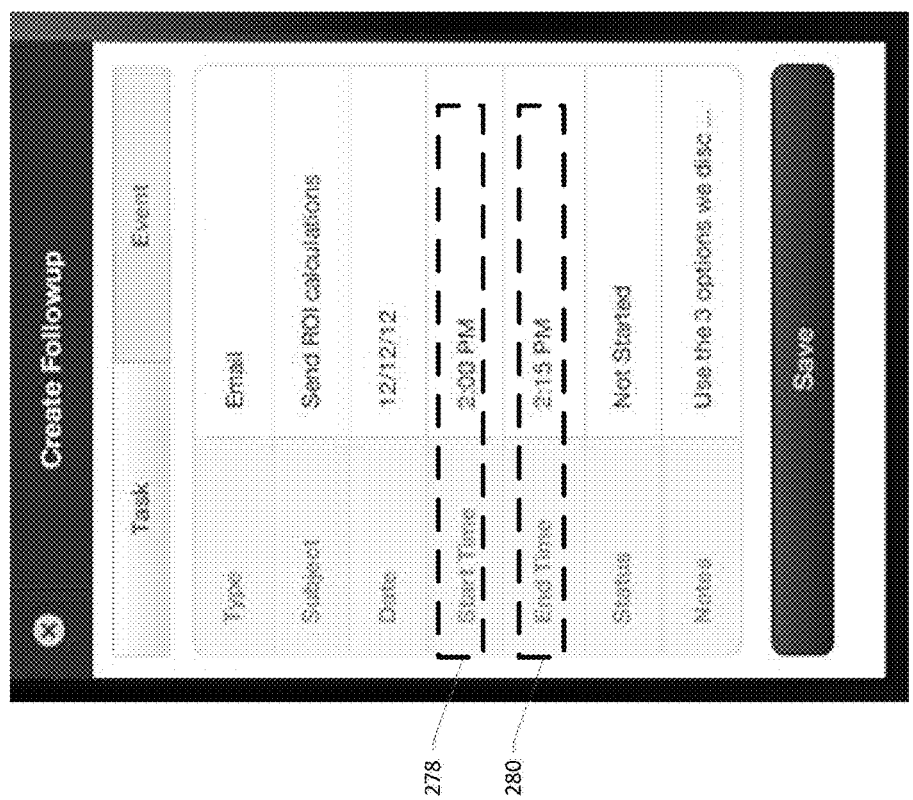

Selection of indicator 276 of FIG. 2F may allow the display to change to an event entry display, such as the display of FIG. 2G. FIG. 2G is a display of an event that may be entered and stored in association with the sales lead on the location based sales module 120. For example, during a sales visit, a sales resource may schedule a future meeting with the sales lead. The sales resource may use the display of FIG. 2G to enter information regarding the future meeting or other event. The follow-up event information is similar to the follow-up task information of FIG. 2F, but may additionally or alternatively include start time 278, and/or end time 280. A sales resource may therefore enter start and end times, along with any other event information. Upon saving the follow-up event information, the follow-up event may be associated with the sales lead in the location base sales module 120. In some embodiments, a corresponding calendar entry on the sales resource device 122 may also be created.

Display 2H is an example display that may be provided by location based sales module 120 to enable a sales resource to flag a provider. Such a display may be provided in response to selection of indicator 228 of display 2A. A sales resource may provide a flag type 282 (e.g., "out of business," "new owner," etc.) and/or details (e.g., free form text providing more information regarding the flag. In this particular example, a sales resource may flag the provider as being out of business, so that the corresponding sales lead is updated in the location based sales module 120. As such, other sales resources viewing the associated sales lead information may see the flag.

Display 2H is an example display that may be provided by location based sales module 120 in response to a sales resource selecting an individual sales lead and/or selecting to view provider details. Area 286 may include a provider name, sales status of the sales lead, last communication details and/or next follow-up task. A map and location of the provider and/or other location information may be provided, as shown by indicator 287. Special conditions and/or sales lead ranking information may be provided, as shown by indicator 288. The information provided at indicator 288 may be provided by supply ID module 104 or the like, to indicate to the sales resource details regarding the values of the sales lead, and potentially emphasizing the higher priority sales leads.

As shown by indicator 289, the provider detail display provided by the location based sales module 120 may further include data from social media websites. Such information may be provided to the location based sales module 120 from the demand module 102, and/or supply ID module 104 for example. The information, such as average ratings across various websites, the number of reviews and followers from social media websites may indicate the popularity of a provider to the sales resource. Additional details such as preferred services offered by a particular provider, consumer feedback and/or the like may provide an indication to the sales resource as to how to structure a particular promotion. The data may help a sales resource assess the value of the sales lead from the promotion service standpoint, and/or may provide a talking point while engaging with a contact at the provider's place of business.

Figure 2J:
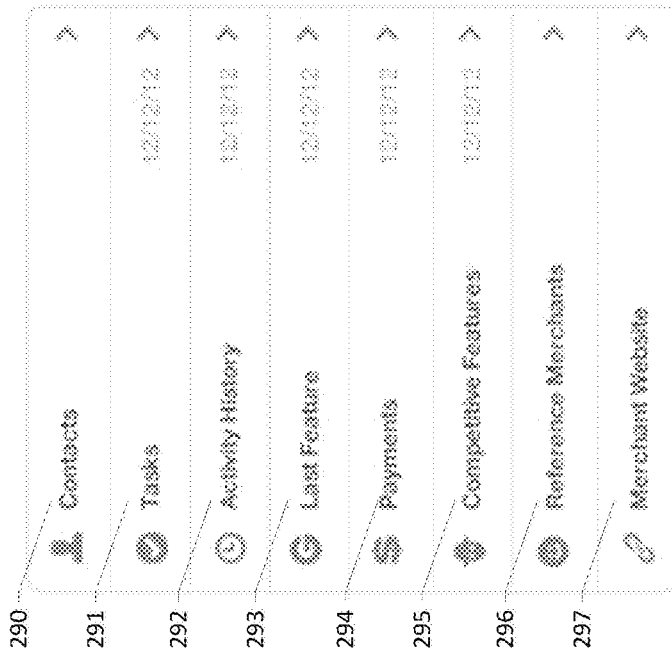
Figure 2K:
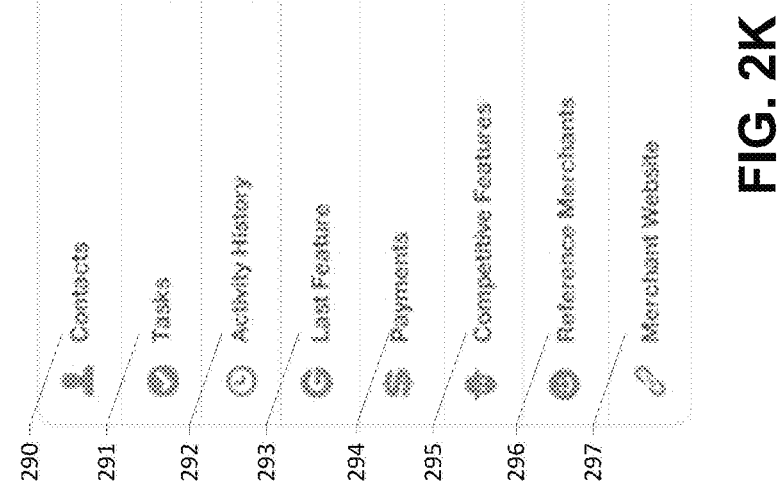
Figure 2I:
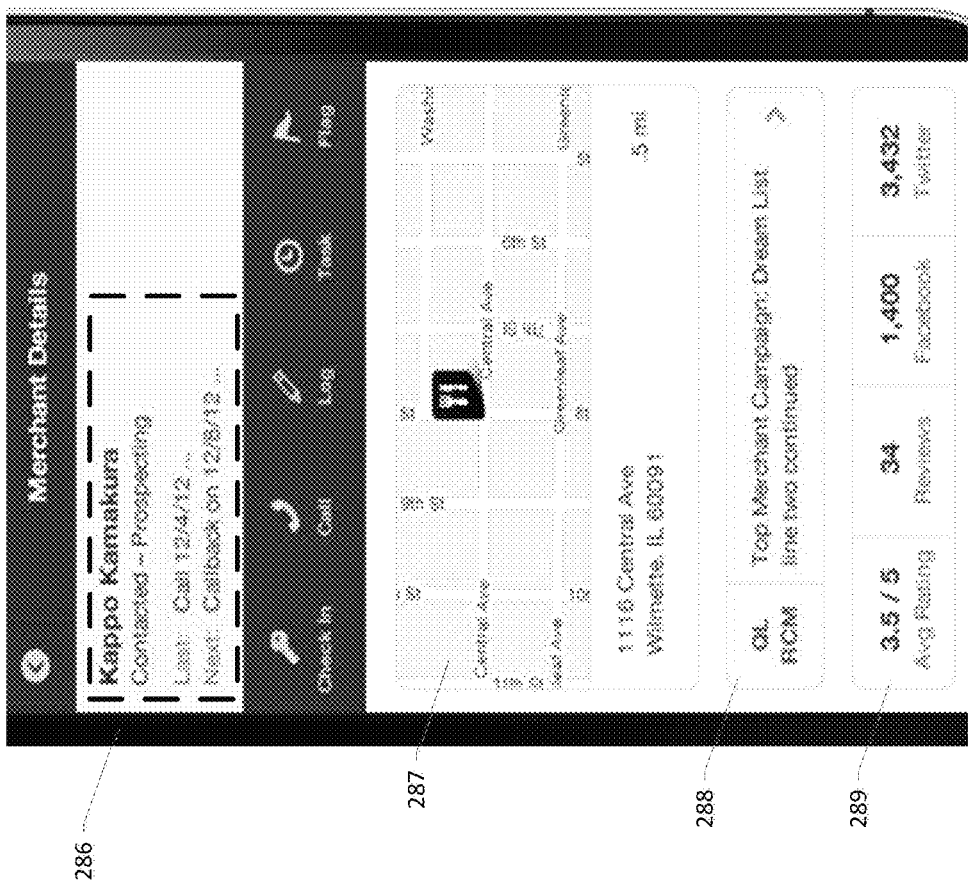

FIG. 2J provides a further example of additional information that may be provided in the provider details, such as the provider details of FIG. 2I. FIG. 2J provides an ownership indicator (e.g., first and last name of the sales resource, email address, phone number and/or alternate phone number (s)), such as in an instance where the sales lead is assigned to a sales resource other than the sales resource using the device. Such functionality may be beneficial to a sales resource that is nearby a colleague's sales lead. The sales resource may then call the assigned sales resource to ask if they'd like them to stop by the sales lead's place of business. The location based sales module 120 may therefore provide for effective communication between sales resources, and may prevent excessive communication to a particular sales lead which could otherwise irritate the sales lead or cause the sales resources and/or promotion service to appear unorganized.

In addition to the provider details of FIG. 2I, the location based sales module 120 may provide a sales resource with a menu to access even further details relating to the provider and/or sales lead. An example menu is provided in FIG. 2K. Contacts link 290 may provide a sales resource with a list of contact information for various individuals, departments, and/or the like associated with the sales lead. Tasks link 291 may allow a sales resource to view open tasks and/or enter a new task (such as with the display of FIGS. 2F and/or 2G). Activity history link 292 may provide for navigation to a display of recent activity, described in further detail below with respect to FIGS. 3F and 3G. Last feature link 293 may provide a sales resource with recent promotion information relating to promotions that the promotion service offered in partnership with the sales lead. More details relating to past promotions are provided with respect to FIGS. 3C and 3D below.

Payments link 294 may allow a sales resource to view information regarding payments from the provider, such as those described with respect to FIG. 3H below. Competitive features link 295 may allow a sales resource to view promotions offered by competitor promotion services and the provider, such as those described with respect to FIGS. 3A and 3B below. Reference merchants (providers) link 296 may provide access to a list of reference providers, such as those described in further detail with respect to FIG. 3J below.

Merchant website link 297 may provide a sales resource with direct access to the provider's website. Accessing the provider website prior to a sales call or visit may allow the sales resource to be knowledgeable regarding the provider's business, products and/or services, a menu, a blog, announcements, price points, current sales and specials, and/or the like. The sales resource may therefore brush up on the sales lead prior to meeting with a sales lead contact and may use information found on the provider's website as a discussion point during a sales pitch and/or contract negotiation.

As shown to the right of links 291-295, some links of the menu provided in FIG. 2K may provide a date and/or time stamp of the last update to the associated information.

Figure 3B:
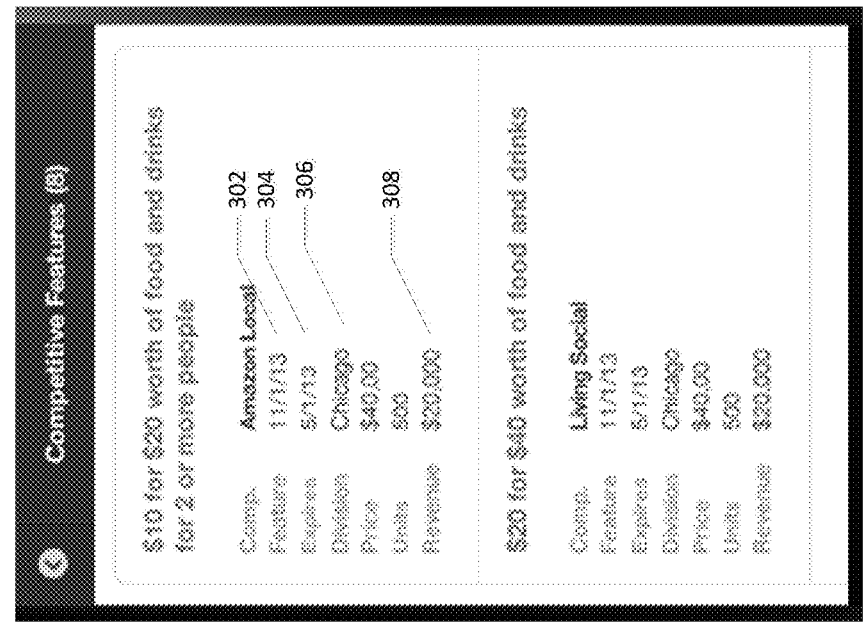
Figure 3A:
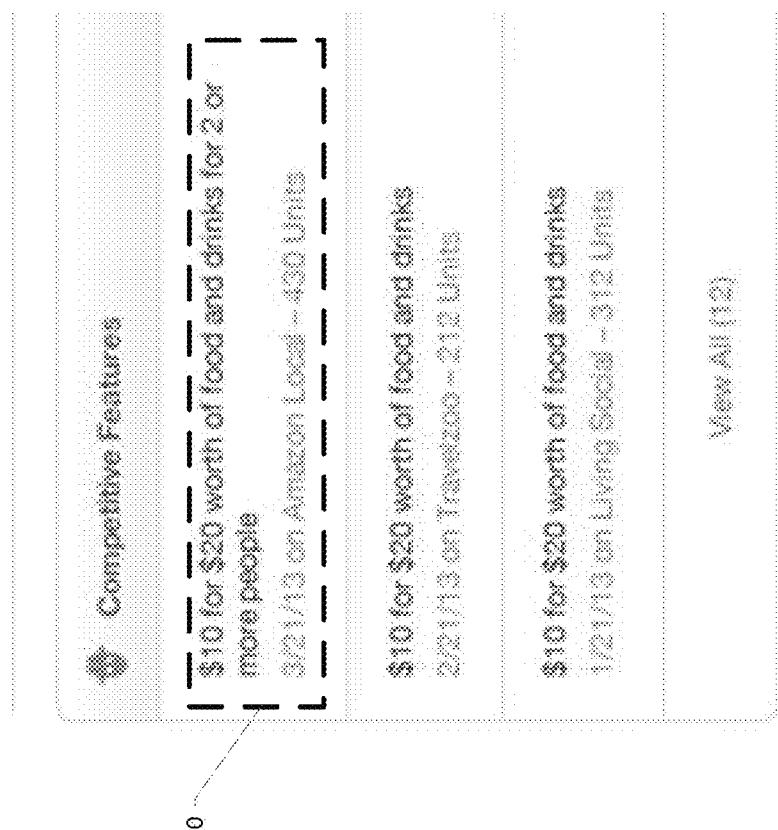

FIG. 3A is an example display provided by location based sales module 120 of competitive promotions and/or features. Competitive promotion information may be provided by demand module 102 and/or the like, and may be shown in area 300 of the display. The competitive promotion information may include a consumer cost (e.g., $10), value (e.g., $20), product and/or service (e.g., food and drinks for 2 or more people), a date offered, competitor promotion service, and/or the number of units sold. Other information that may be included, in some examples, may be an estimated ROI that the provider received from that promotion, indications of feedback from consumers with respect to the promotion and other indications that may assist in the sales of a future promotion.

The display of FIG. 3B is another example display providing competitive promotion information. Additional information beyond the information provided in the display of FIG. 3A includes a promotion start date 302, promotion expiration date 304, a division and/or provider location 306, and/or revenue to the provider (shown by indicator 308). As such, a sales resource may use a display such as the displays of FIGS. 3A and/or 3B to view promotions offered based on a partnership between the provider and the promotion service's competitor(s), and use the information to the sales resource's advantage during a sales pitch and/or contract negotiation.

Figure 3D:
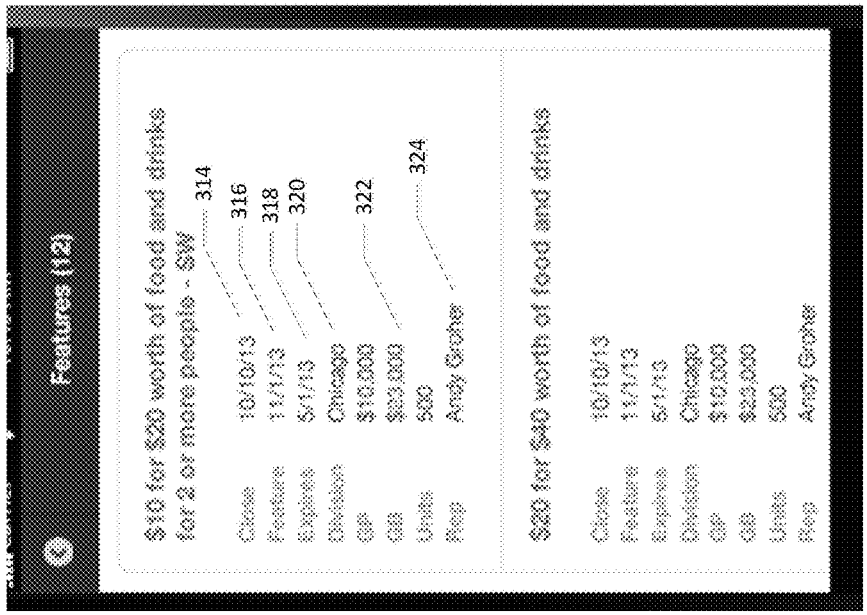
Figure 3C:
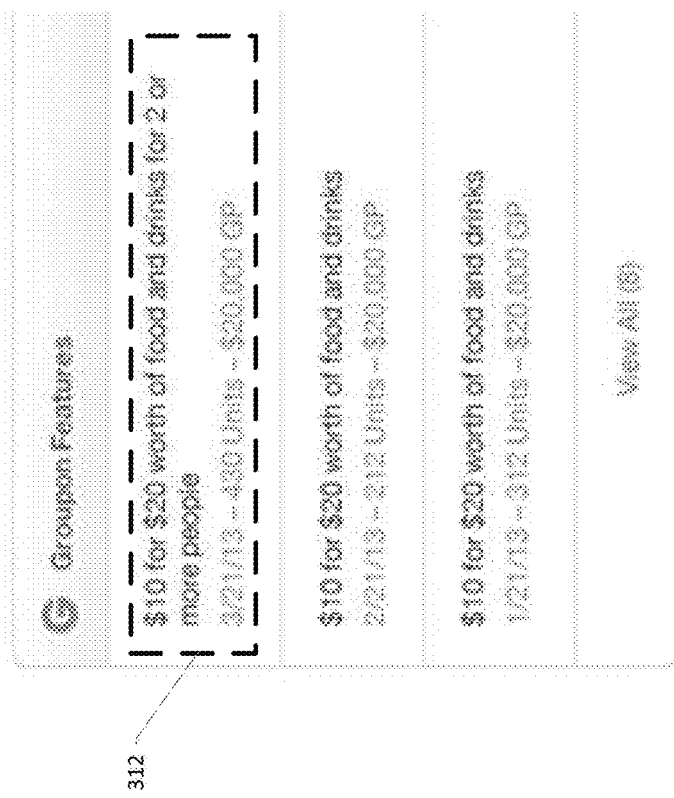

FIG. 3C is an example display that may be provided by location based sales module 120 to provide past promotions offered by the provider and promotion service. The past promotions may therefore represent past sales to the sales lead. The information provided in area 312 may include a consumer cost (e.g., $10), value (e.g., $20), product and/or service (e.g., food and drinks for 2 or more people), a date offered, number of units sold, and/or the margin, revenue or gross profit to the promotion service (e.g., $20,000). The gross profit may be calculated, for example, by totaling the payments received from consumers who purchased promotions and subtracting the payments made to the provider as a result of promotion purchases.

The display of FIG. 3D is another example display providing past promotion information. Additional information beyond the information provided in the display of FIG. 3E includes a close date 314, indicating the date a contract between the promotion service and provider was closed. Also provided may be a feature start date 316, indicating the date the promotion was first offered to consumers, and/or a promotion expiration date 318, indicating the expiration date of the promotion. Division 320 may provide the division or location of the provider. Gross buy amount 322 may indicate the total amount of received from the purchases of the promotions by consumers, payable to the promotion service. Sales resource 324 provides the name of the sales resource that negotiated the sale to and/or closed the contract with the provider. The display of FIGS. 3C-3D may be referenced by a sales resource to discuss the success of previous promotions offered be the provider.

Figure 3E:
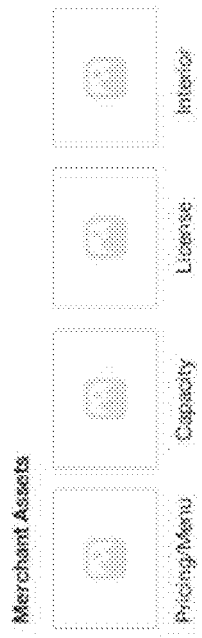

FIG. 3E is an example display of additional menu items that may be displayed to a sales resource. The sales resource may therefore access pricing and/or menu information associated with the provider, capacity of the provider's place of business, any licenses held by the provider, and/or additional information and/or photos of the provider's interior retail space or other place of business. The information may be provided to the location based sales module 120 by the supply ID module 104, for example, and may provide talking points or otherwise assist a sales resource in preparing for a sales pitch to the sales lead.

Figure 3G:
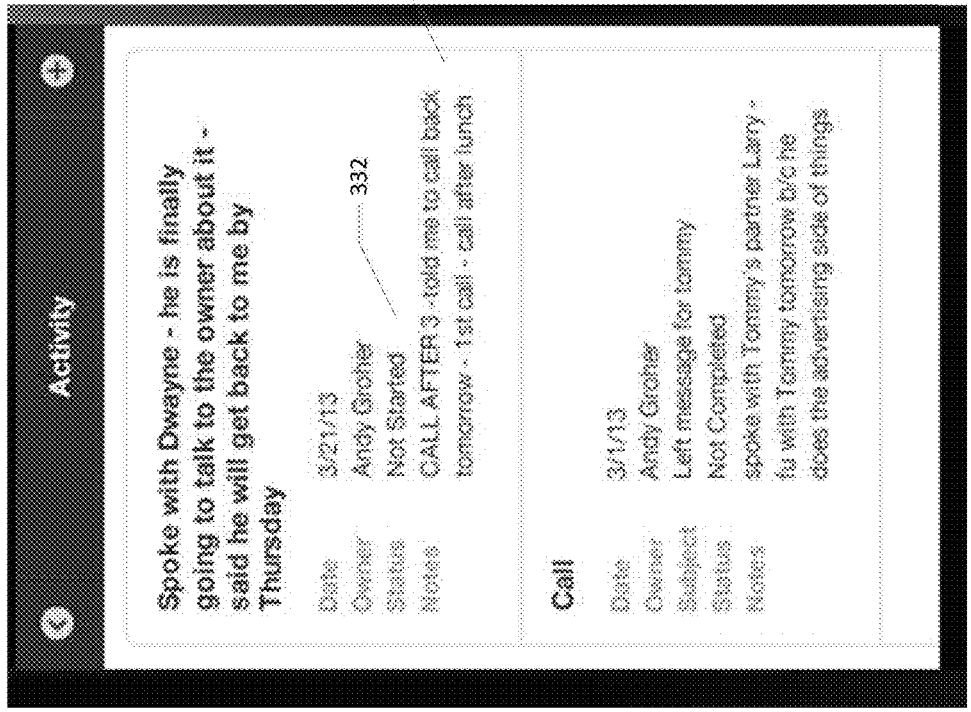
Figure 3F:
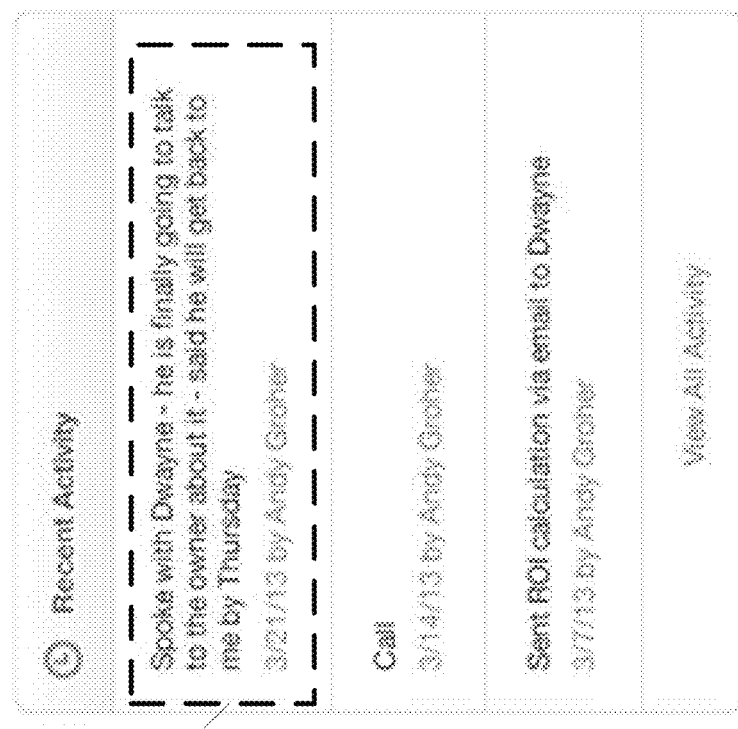

FIG. 3F is an example display of an activity log and/or recent activity that may be associated with the sales lead in the location based sales module 120. A listing of summarized activities relating to and/or communications with the sales lead may be provided. The example activity summary 330 includes a brief description of the activity, the date of the entry, and the name of the sales resource who entered the activity. As such, a sales resource viewing the display may recall their own communication with the sales lead, and/or review activities of colleague sales resources. For example, a sales resource nearby a particular provider may view the activity log and discover the assigned sales resource has not contacted the provider in several months, and may contact the assigned sales resource to offer to check-in on the provider while in the neighborhood.

FIG. 3G is an example display provided by the location based sales module 120 that provides additional detail to the activity log of FIG. 3F. The display of FIG. 3G may additionally provide a status 332 and notes 334. A display, such as the display in 3G may advantageously provide the necessary backstory for future sales resources when contacting the provider.

Figure 3I:
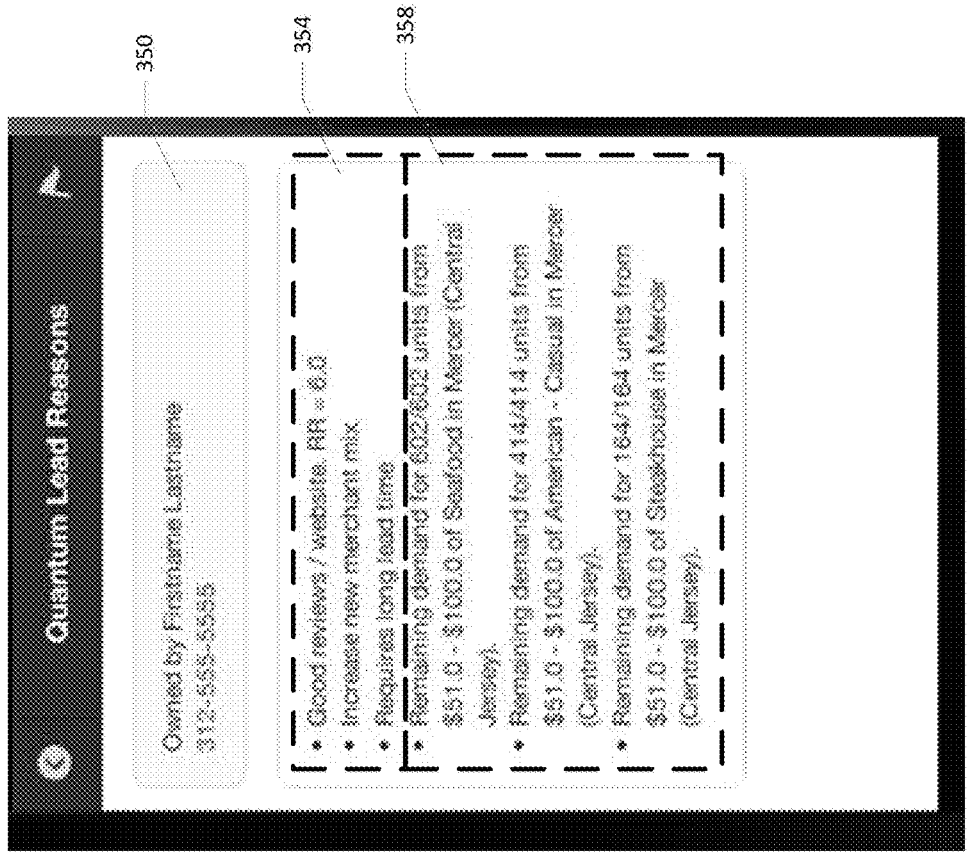
Figure 3H:

FIG. 3H is an example display provided by the location based sales module 120 to provide payment information regarding payments from the promotion service to the provider associated with the sales lead, which may have occurred as a result of a consumer redeeming a promotion at the provider. The payment information 340 may be related to a past promotion or a current promotion, such as those appearing on the display of FIGS. 3C and/or 3D, for example. The payment summary 340 may include a payment amount, data, currency type, and method of payment (e.g., ACH (Automated Clearing House)). The payment information may be useful to a sales resource in the event a contact at the provider has questions regarding payments during a meeting and/or sales pitch. The sales resource may then quickly retrieve the payment information using their sales resource device.

FIG. 3I is an example display provided by the location based sales module 120 to provide reasons and additional sales lead data. Ownership indicator 350 may provide assigned sales resource information such as a first and last name, and phone number of the sales resource. As shown in area 354, the location based sales module 120 may provide information, such as provided by supply ID module 104, describing reasons why the sales lead has been identified and/or evidence supporting a sales value score. For example, the associated provider may have good reviews and website feedback and therefore may be a better choice to provide a particular promotion when compared with lower rated providers. The provider may have been identified due to the promotion service wanting to diversify the types of providers for which the promotion service offer promotions. Notes regarding an estimate of a short or long lead time may also be provided (e.g., probability that a sale will close and/or the estimated time for a sale to close). A sales resource may access the information in order to assess what types of sales pitches to provide to the provider.

Area 358 may include demand information such as provided to location based sales module 120 by demand module 102. The information may include a residual demand (e.g., number of units remaining out of a total number of targeted units), a price range for a demanded offer, product and/or service type, and/or location of the demand. A sales resource may then place emphasis on closing a contract with a provider to offer a promotion having a large residual demand or to address the needed demand in that local area. The data may therefore impact the parameters of the contract the sales resource pitches to the provided, such as the number of units of a promotion to offer, the particular product or service to offer and/or the location in which the promotion is offered. As such, the sales resource may try to close a steakhouse deal over $100 in lieu of another good or service that may be offered by a particular provider.

Figure 3K:
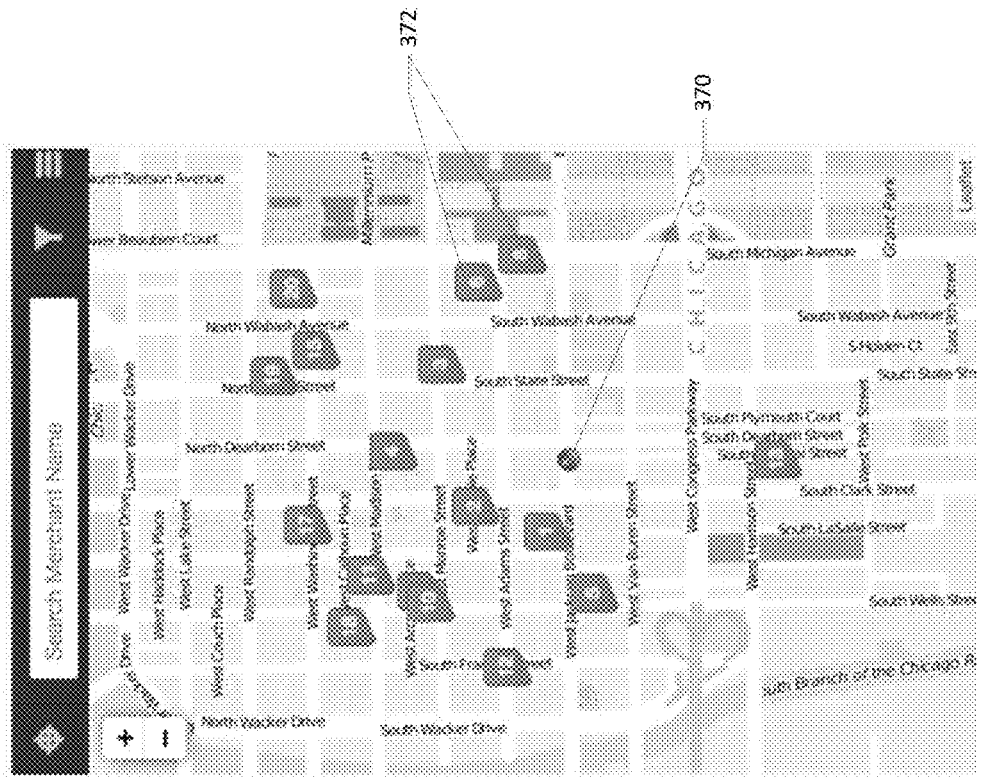
Figure 3J:
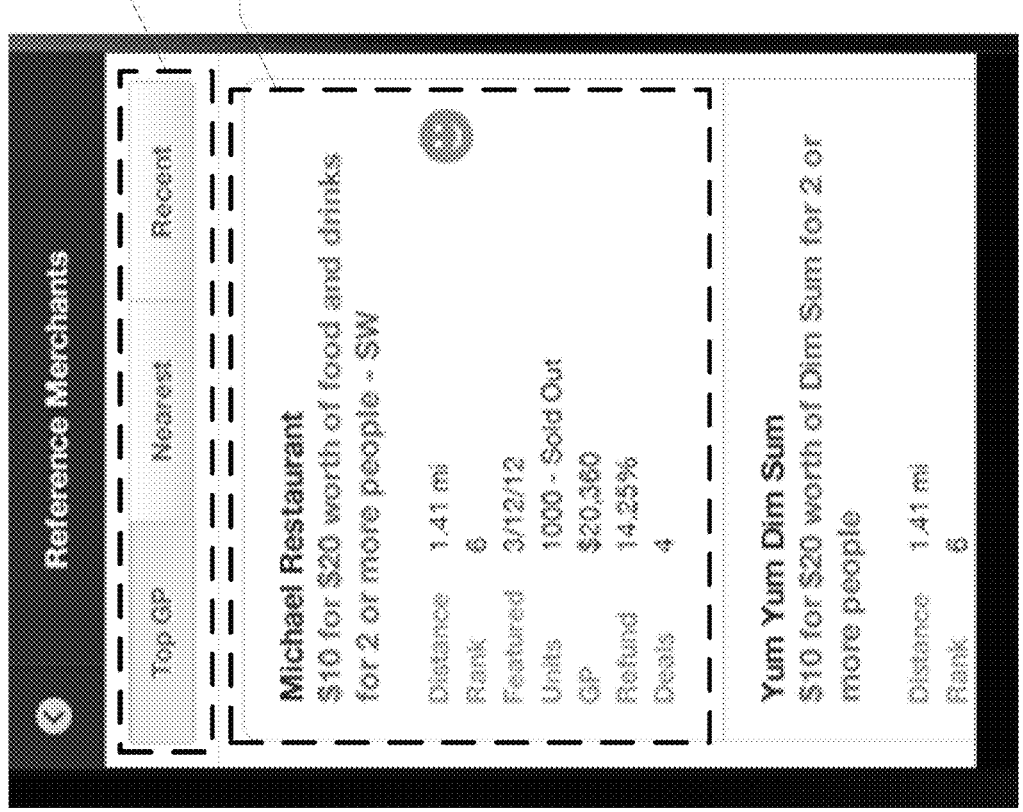

FIG. 3J is an example display provided by location based sales module 120 that may be referenced by a sales resource to view reference providers to a particular sales lead. A reference provider may be considered a provider in close proximity to the sales lead, and/or a provider offering a similar product and/or service. As shown in area 360, the reference providers may be sorted and/or filtered by top gross profit, nearest (e.g., providers in close proximity to the reference location), and/or recent (e.g., providers offering promotions most recently). Reference provider information 362, which may be displayed on a list of reference providers may include a provider name and promotion information including consumer cost, value, and product and/or service offered. A distance between the sales lead and the reference provider may additionally be provided. A ranking of the provider may also be displayed, indicating a priority of the sales lead relative to other sales leads in the geographic area. The reference provider information may additionally or alternatively include a number of units offered and/or sold (and an indication if the units were sold out), gross profit, percentage of refunds (e.g., the portion of purchased promotions that had to be refunded in the past), and the number of distinct promotions or deals offered by the reference provider.

The reference provider information of FIG. 3J may provide a sales resource with valuable information to prepare for a sales pitch to a sales lead. The sales resource may therefore describe with reference to specific data, how competitor providers have benefited from partnering with the promotion service to offer a promotion. In some examples, such data may include ROI data, increased sales velocity, increased traffic at the provider's point of business and/or the like. Example embodiments of a system and method for determining and providing merchant ROI information are described further with respect to U.S. Provisional Patent Application 61/824,850 filed May 17, 2013 and U.S. patent application Ser. No. 13/841,347 filed Mar. 15, 2013, which are herein incorporated by reference in its entirety.

FIG. 3K provides an additional example display provided by location based sales module 120 that may be referenced by a sales resource to view sales leads 372 on a map-based view relative to a location 370. The location 370 may be a current location of the sales resource, and/or a searched location. In the display of FIG. 3K, the twenty closest's sales leads to the location 370 are displayed on a map-based view. This feature may assist a sales resource in identifying nearby sales leads to visit.

Figure 4:
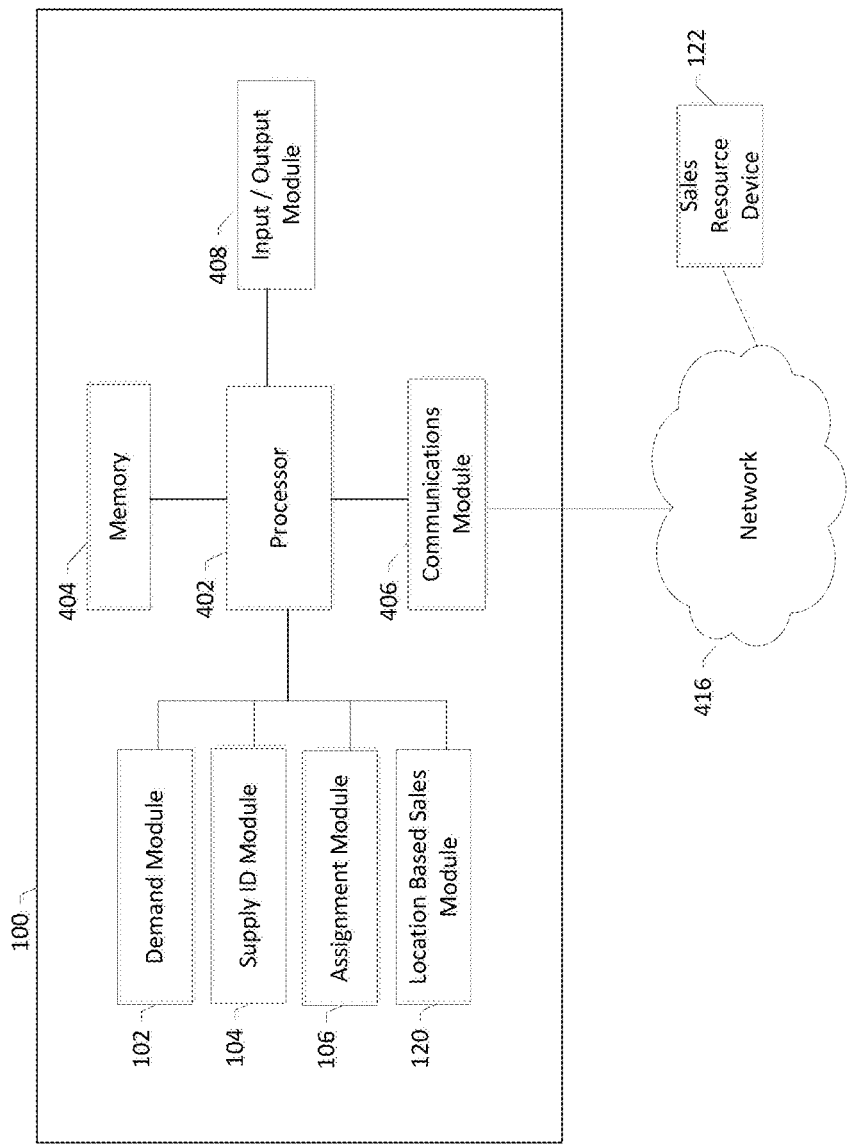
FIG. 4 is a schematic block diagram of a promotional system in accordance with an example embodiment.

Having now described example displays provided by the location based sales module 120 to facilitate mobile sale lead identification, FIG. 4 provides an implementation of the promotional system 100 according to an example embodiment.

In accordance with some example embodiments, promotional system 100 may include various means, such as one or more processors 402, memories 404, communications modules 406, and/or input/output modules 408. A promotional system 100 may further include demand module 102, supply ID module 104, assignment module 106 and/or location based sales module 120, among other things (not shown). As referred to herein, the term "module" includes hardware, software and/or firmware configured to perform one or more particular functions. In this regard, promotional system 100 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 404) that is executable by a suitably configured processing device (e.g., processor 402), or some combination thereof.

Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments, processor 402 comprises a plurality of processors. The plurality of processors may be embodied on a single computing device or may be distributed across a plurality of computing devices collectively configured to function as promotional system 100. The plurality of processors may be in operative communication with each other and may be collectively configured to perform one or more functionalities of promotional system 100 as described herein. In an example embodiment, processor 402 is configured to execute instructions stored in memory 404 or otherwise accessible to processor 402. These instructions, when executed by processor 402, may cause promotional system 100 to perform one or more of the functionalities of promotional system 100 as described herein.

Whether configured by hardware, firmware/software methods, or by a combination thereof, processor 402 may comprise an entity capable of performing operations according to embodiments of the present invention while configured accordingly. Thus, for example, when processor 402 is embodied as an ASIC, FPGA or the like, processor 402 may comprise specifically configured hardware for conducting one or more operations described herein. As another example, when processor 402 is embodied as an executor of instructions, such as may be stored in memory 404, the instructions may specifically configure processor 402 to perform one or more operations described herein, such as those discussed in connection with FIGS. 5 and 6 below.

Memory 404 may comprise, for example, volatile memory, non-volatile memory, or some combination thereof. Although illustrated in FIG. 4 as a single memory, memory 404 may comprise a plurality of memory components. The plurality of memory components may be embodied on a single computing device or distributed across a plurality of computing devices. In various embodiments, memory 404 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In some embodiments, memory 404 may comprise a suitable network database (e.g., provider database 116) configured to store demand information, promotion data, and/or sales lead information as described herein. Additionally or alternatively memory 404 may be configured to store such data as well as various applications, instructions, or the like for enabling promotional system 100 to carry out various functions in accordance with example embodiments of the present invention. For example, in at least some embodiments, memory 404 is configured to buffer input data for processing by processor 402. Additionally or alternatively, memory 404 may be configured to store program instructions for execution by processor 402. Memory 404 may store information in the form of static and/or dynamic information. This stored information may be stored and/or used by promotional system 100 during the course of performing its functionalities.

Communications module 406 may be embodied as any device or means embodied in circuitry, hardware, a computer program product comprising computer readable program instructions stored on a computer readable medium (e.g., memory 404) and executed by a processing device (e.g., processor 402), or a combination thereof that is configured to receive and/or transmit data from/to another device, such as, for example, a second promotional system 100 and/or the like. In some embodiments, communications module 406 (like other components discussed herein) can be at least partially embodied as or otherwise controlled by processor 402. In this regard, communications module 406 may be in communication with processor 402, such as via a bus. Communications module 406 may include, for example, an antenna, a transmitter, a receiver, a transceiver, network interface card and/or supporting hardware and/or firmware/software for enabling communications with another computing device. Communications module 406 may be configured to receive and/or transmit any data that may be stored by memory 404 using any protocol that may be used for communications between computing devices, such as between the promotional system 100 and a sales resource device 122. Communications module 406 may additionally or alternatively be in communication with the memory 404, input/output module 408 and/or any other component of promotional system 100, such as via a bus.

Input/output module 408 may be in communication with processor 402 to receive an indication of a user input and/or to provide an audible, visual, mechanical, or other output to a user (e.g., provider and/or consumer). As such, input/output module 408 may include support, for example, for a keyboard, a mouse, a joystick, a display, a touch screen display, a microphone, a speaker, a RFID reader, barcode reader, biometric scanner, and/or other input/output mechanisms. In embodiments wherein promotional system 100 is embodied as a server or database, aspects of input/output module 408 may be reduced as compared to embodiments where promotional system 100 is implemented as an end-user machine (e.g., sales resource device 122) or other type of device designed for complex user interactions. In some embodiments (like other components discussed herein), input/output module 408 may even be eliminated from promotional system 100. Alternatively, such as in embodiments wherein promotional system 100 is embodied as a server or database, at least some aspects of input/output module 408 may be embodied on an apparatus used by a user that is in communication with promotional system 100, such as for example, sales resource device 122. Input/output module 408 may be in communication with the memory 404, communications module 406, and/or any other component(s), such as via a bus. Although more than one input/output module and/or other component can be included in promotional system 100, only one is shown in FIG. 4 to avoid overcomplicating the drawing (like the other components discussed herein).

Modules 102, 104, 106 and 120 may provide functionality related to determining demand, identifying sales leads, assigning sales leads to sales resources, providing location based sales lead information to sales resources, and/or the like, as described herein and above with respect to FIG. 1. In some embodiments, some or all of the functionality of the modules may be performed by processor 402. For example, non-transitory computer readable storage media can be configured to store firmware, one or more application programs, and/or other software, which include instructions and other computer-readable program code portions that can be executed to control each processor (e.g., processor 402 and/or any of the modules 102, 104, 106 and/or 120) of the promotional system 100 to implement various operations. As such, a series of computer-readable program code portions are embodied in one or more computer program products and can be used, with a computing device, server, and/or other programmable apparatus, to produce machine-implemented processes.

Promotional system 100 may be coupled to one or more sales resources devices 122 via network 416. In this regard, network 416 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 416 may include a cellular telephone, an 802.11, 802.16, 802.20, and/or WiMax network. Further, the network 416 may include a public network, such as the Internet, a private network, such as an intranet, or combinations thereof, and may utilize a variety of networking protocols now available or later developed including, such as, but not limited to, TCP/IP based networking protocols.

Any number of sales resource devices 122 may be implemented as a personal computer and/or other networked device, such as a cellular phone, tablet computer, mobile device, etc., that may be used to access promotional system 100 in order to obtain mobile location based sales lead information from promotional system 100. As such, a sales resource may use a sales resource device 122 to view example displays provided by the location based sales module 120 such as those provided in FIGS. 2A-2K and 3A-3K. In some embodiments, information regarding a sales lead may be transmitted from a sales resource device 122 to the promotional system 100, that may be used, for example to update sales lead and/or demand information in any of the modules 102, 104, 106, and/or 120.

As will be appreciated, any such computer program instructions and/or other type of code may be loaded onto a computer, processor or other programmable apparatus circuitry to produce a machine, such that the computer, processor, or other programmable circuitry that executes the code on the machine creates the means for implementing various functions, including those described herein.

It is also noted that all or some of the information presented by the example displays discussed herein can be based on data that is received, generated and/or maintained by one or more components of promotional system 100. In some embodiments, one or more external systems (such as a remote cloud computing and/or data storage system) may also be leveraged to provide at least some of the functionality discussed herein.

Figure 5:
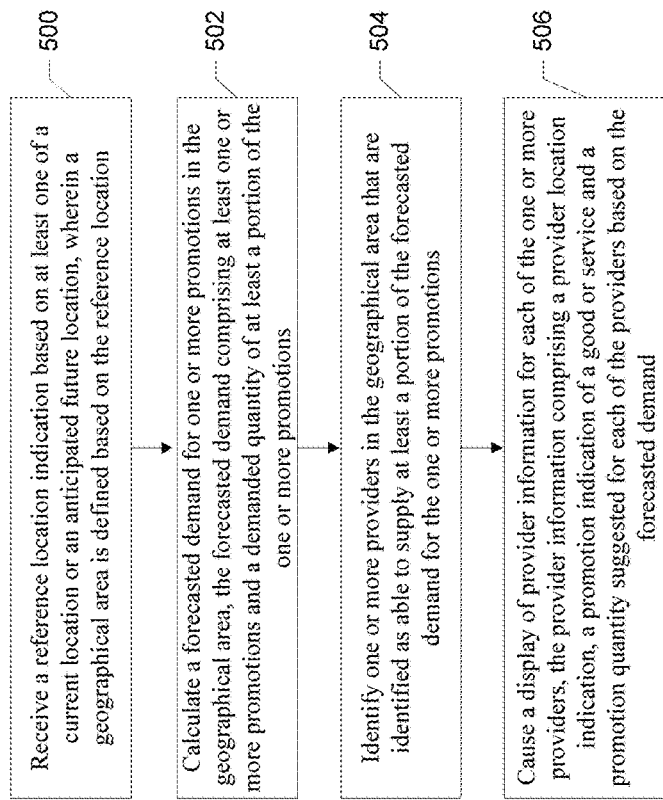
FIG. 5 is a flowchart illustrating operations for providing location based sales lead information, according to an example embodiment.

FIG. 5 illustrates an example process that may be performed by the promotional system 100 according to an example embodiment. As shown by operation 500, the promotional system 100 may include means, such as the location based sales module 120, processor 402, and/or the like, for receiving a reference location indication based on at least one of a current location or an anticipated future location, wherein a geographical area is defined based on the reference location. As described above with respect to FIG. 2A, the reference location indication may be manually provided by a sales resource (e.g., such as by entry of an address to which the sales resource plans to travel), or automatically detected using a GPS and/or the like implemented on the sales resource device 122. The reference location indication may therefore be communicated to the promotional system 100 (such as by network 416 and/or communication interface 406, for example), and a geographical area determined such as by location based sales module 120, processor 402, and/or the like.

In some examples, the location may be part of a sales resource planning system. In such cases, the location of an already scheduled visit (e.g. a scheduled visit to a particular provider as determined based on a calendaring application, an indication in the location based sales module 120 or the like), an indication of a particular region to be visited and/or the like may be used to determine other providers to visit. In some examples, the other providers may be determined based on proximity, available time, level of interest, sales value score, demand and/or the like. In some examples, the location based sales module 120 in conjunction with the processor 402 may generate a plan of attack or an itinerary for a sales resource based on the receipt of the location information.

As shown by operation 502, the promotional system 100 may include means, such as the demand module 102, processor 402, and/or the like, for calculating a forecasted demand for one or more promotions in the geographical area, the forecasted demand comprising at least one or more promotions and a demanded quantity of at least a portion of the one or more promotions. The demand module 102 may calculate forecasted demand based on virtual promotions and/or residual demand after taking into account known inventory, as provided by the supply ID module 104, for example.

Continuing to operation 504, the promotional system 100 may include means, such as the supply ID module 104, location based sales module 120, processor 402 and/or the like for identifying one or more providers in the geographical area that are identified as able to supply at least a portion of the forecasted demand for the one or more promotions. As such, and as described with respect to FIG. 1, the promotional system 100 may access the provider database 116 and/or the like to identify providers in the geographical area (e.g., in close proximity to the reference location) that may be able to meet the forecasted demand.

As shown by operation 506, the promotional system 100 may include means, such as the location based sales module 120, input/output module 408 and/or the like for causing a display of provider information for each of the one or more providers, the provider information comprising a provider location indication, a promotion indication of a good or service, and a promotion quantity suggested for each of the providers based on the forecasted demand. The provider location indication may include, for example, a map based view such as illustrated in FIGS. 2B and 21. Additionally or alternatively, the provider location indication may include a distance from the reference location, such as the distance 202 of FIG. 2A. The promotion indication including a good or service, and promotion quantity may be provided on a display such as in area 358 of FIG. 3I, for example. The information may be displayed on a sales resource device 122 in order to provide the information to a sales resource during or in between sales visits.

Figure 6:
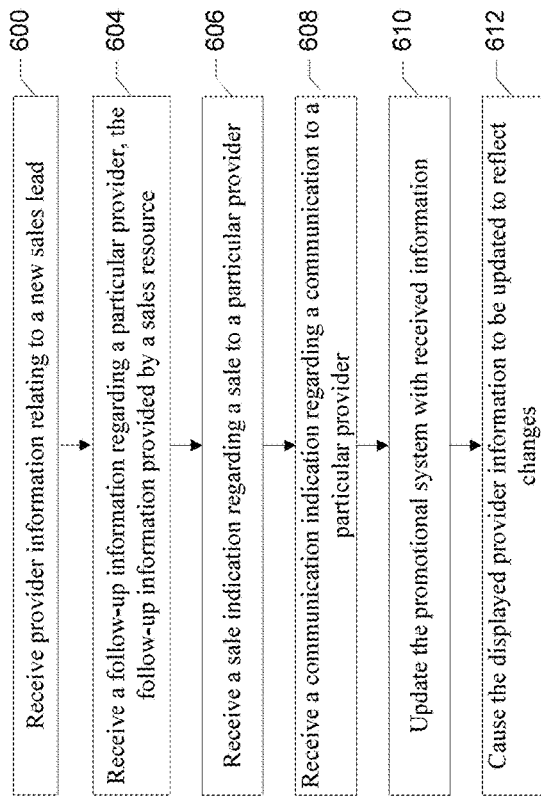
FIG. 6 is a flowchart illustrating operations for receiving sales lead information, according to an example embodiment.

FIG. 6 illustrates a process that may be performed by the promotional system 100 according to an example embodiment. As shown by operation 600, the promotional system 100 may include means, such as the location based sales module 120, the communications module 406, and/or the like, for receiving provider information relating to a new sales lead. The information may be provided by a sales resource by selecting the link 244 on the display of FIG. 2D, for example, which may be provided on a sales resource device 122.

As shown by operation 604, the promotional system 100 may include means, such as the location based sales module 120, the communications module 406, and/or the like, for receiving follow-up information regarding a particular provider, the follow-up information provided by a sales resource. The information may be provided by a sales resource by using displays such as those of FIGS. 2F and/or 2G, for example, which may be provided on a sales resource device 122.

As shown by operation 606, the promotional system 100 may include means, such as the location based sales module 120, the communications module 406, and/or the like, for receiving a sale indication regarding a sale to a particular provider. The information may be provided by a sales resource using a sales resource device 122, and my include information regarding the consumer cost of the promotion, the value of the promotion, the product and/or service offered, a number of units, and/or any other information agreed upon in a sales contract.

Continuing to operation 608, the promotional system 100 may include means, such as the location based sales module 120, the communications module 406, and/or the like, for receiving a communication indication regarding a communication to a particular provider. The information may be provided manually by a sales resource using a sales resource device 122 and a display such as the display of FIG. 2E, for example. Additionally or alternatively, a communication indication may be automatically detected such as by detection of an outgoing call from the sales resource device to a contact associated with a provider.

As shown by operation 610, the promotional system 100 may include means, such as the location based sales module 120, processor 402, memory 404, communications module 406, and/or the like, for updating the promotional system with received information, such as any of the information received with respect to operations 600-608 described above and/or other information provided by a sales resource, via a sales resource device 122, for example, and described with respect to the displays of FIGS. 2A-2K and 3A-3K above. The information may therefore be updated on the provider database 116, memory 404, and/or the like.

Continuing to operation 612, the promotional system 100 may include means, such as the location based sales module 120, processor 402, communications module 406, input/output module 408 and/or the like, for causing the displayed provider information on the sales resource device 122 to be updated to reflect changes. As such, various sales resources working simultaneously in a same area may be provided with the most up to date demand information, sales lead information, and/or the like.

As described above, providing sales resources with location based sales lead information may increase their efficiency during and in between sales visits, making the most of their time. Providing on demand sales lead information by location, current demands for promotions, competitor promotion history, and/or the like may help a sales resource produce an effective sales pitch to a provider, ultimately increasing sales and revenue for the promotion service. Activity logs and follow-up task tracking may allow multiple sales resources working in the same geographic area to easily contact each other's assigned sales leads, when necessary, without having to track down information regarding past communications and next steps in the sales process. In some embodiments, a sales resource may even receive a push notification and/or text message on the sales resource device 122 indicating the sales lead (e.g., a sales lead that is assigned to the sales resource, is "house" owned, approved by the promotion service, and/or the like) is in proximity to a sales lead, further encouraging drop-in visits with the sales lead.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 402, demand module 102, supply ID module 104, assignment module 106, and/or location based sales module 120 to produce a machine, such that the computer program product includes the instructions which execute on the computer or other programmable data processing apparatus create a means for implementing the functions specified in the flowchart block or blocks.

These computer program instructions may also be stored in a computer-readable storage medium (e.g., memory 404) that can direct a computer or other programmable data processing apparatus to function in a particular manner, such that the instructions stored in the computer-readable storage medium produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing mobile location based sales leads via a graphical user interface configured for display by a sales resource device, the sales leads identified based on a current consumer demand for promotions and a real-time detected location of the sales resource device affiliated with a promotion service, the method comprising:
    receiving over a network, at a server associated with the promotion service, the real-time detected location of the sales resource device;
    with the server, defining a geographical area based on the real-time detected location of the sales resource device;
    calculating, with the server associated with the promotion service, the current consumer demand for one or more promotions in the geographical area based on virtual offers, the consumer demand comprising one or more promotions and a demanded quantity of at least a portion of the one or more promotions;
    identifying one or more providers in the geographical area that are identified as able to supply at least a portion of the current consumer demand for the one or more promotions, thereby identifying the one or more provider as one or more sales leads;
    in response to the identification of the one or more sales leads, transmitting, over a network, a notification to the sales resource device, wherein the notification causes the graphical user interface to display provider information for each of the one or more sales leads, the provider information comprising, for each sales lead, a provider location indication, a promotion indication of a good or service, and a promotion quantity suggested for each of the providers based on the current consumer demand;
    for each of the one or more sales leads, calculating a probability of closing an agreement between the promotion service and the respective provider for the promotion service to offer the promotion for the good or service on behalf of the respective provider;
    further responsive to the receipt of the real-time detected location of the sales resource device by the server, providing a list of the one or more providers, via the graphical user interface, in an order of proximity to the sales resource device;
    generating, by the server, a next provider indication, and causing display thereof via the graphical user interface, wherein the next provider indication provides the sales resource device with a suggested next provider of the one or more providers to visit next based at least in part on proximity of the sales resource device to the suggested next provider in the geographical area; and
    causing the probability of closing the agreement to be displayed via the graphical user interface.

2. The method of claim 1, further comprising:
    receiving a sale indication via the sales resource device, the sale indication relating to closing the agreement between the promotion service and the respective provider for the promotion service to offer the promotion for the good or service on behalf of the respective provider; and
    in response to receiving the sale indication, updating the current consumer demand on the promotional system.

3. The method of claim 1, wherein the provider information further comprises an ownership indicator identifying a sales resource associated with the provider.

4. The method of claim 1, wherein the provider information further comprises activity history indicating a particular sales resource having interacted with the provider.

5. The method of claim 1, wherein the provider information further comprises competitive promotion information associated with a promotion provider identified as a competitor, the competitive promotion information comprising at least a promotion cost and value, and units sold.

6. An apparatus for providing mobile location based sales leads via a graphical user interface configured for display by a sales resource device, the sales leads identified based on a current consumer demand for promotions and a real-time detected location of the sales resource device affiliated with a promotion service, the apparatus comprising at least one processor and at least one memory including computer program code configured to, with the processor, cause the apparatus to:
    receive over a network, the real-time detected location of the sales resource device;
    define a geographical area based on the real-time detected location of the sales resource device;
    calculate the current consumer demand for one or more promotions in the geographical area based on virtual offers, the current consumer demand comprising at least one or more promotions and a demanded quantity of at least a portion of the one or more promotions;
    identify one or more providers in the geographical area that are identified as able to supply at least a portion of the current consumer demand for the one or more promotions, thereby identifying the one or more provider as one or more sales leads;
    in response to the identification of the sales leads, transmit, over a network, a notification to the sales resource device, wherein the notification causes the graphical user interface to display provider information for each of the one or more sales leads, the provider information comprising, for each sales lead, a provider location indication, a promotion indication of a good or service, and a promotion quantity suggested for each of the providers based on the current consumer demand;
    for each of the one or more sales leads, calculate a probability of closing an agreement between the promotion service and the respective provider for the promotion service to offer the promotion for the good or service on behalf of the respective provider;

further responsive to the receipt of the real-time detected location of the sales resource device by the apparatus, provide a list of the one or more providers, via the graphical user interface, in an order of proximity to the sales resource device; and generate, by the at least one processor, a next provider indication, and cause display thereof via the graphical user interface, wherein the next provider indication provides the sales resource device with a suggested next provider of the one or more providers to visit next based at least in part on proximity of the sales resource device to the suggested next provider in the geographical area; and cause the probability of closing the agreement to be displayed via the graphical user interface.

7. The apparatus of claim 6, wherein the at least one processor and at least one memory include computer program code configured to, with the processor, cause the apparatus to:

for each of the one or more sales leads, calculate a probability of closing the agreement between the promotion service and the respective provider for the promotion service to offer the promotion for the good or service on behalf of the respective provider; and cause the probability of closing the agreement to be displayed on the sales resource device.

8. The apparatus of claim 6, wherein the at least one processor and at least one memory include computer program code configured to, with the processor, cause the apparatus to:

receive a sale indication via the sales resource device, the sale indication relating to closing an agreement between the promotion service and the respective provider for the promotion service to offer the promotion for the good or service on behalf of the respective provider; and in response to receiving the sale indication, update the consumer demand on the promotional system.

9. The apparatus of claim 6, wherein the provider information further comprises an ownership indicator identifying a sales resource associated with the provider.

10. The apparatus of claim 6, wherein the provider information further comprises activity history indicating a particular sales resource having interacted with the provider.

11. The apparatus of claim 6, wherein the provider information further comprises competitive promotion information associated with a promotion provider identified as a competitor, the competitive promotion information comprising at least a promotion cost and value, and units sold.

12. A computer program product for providing mobile location based sales leads via a graphical user interface configured for display by a sales resource device, the sales leads identified based on a current consumer demand for promotions and a real-time detected location of the sales resource device affiliated with a promotion service, the computer program product comprising at least one non-transitory computer-readable storage medium having computer-executable program code instructions stored therein, the computer-executable program code instructions comprising program code instructions to:

receive over a network, at a server associated with the promotion service, the real-time detected location of the sales resource device;

define a geographical area based on the real-time detected location of the sales resource device;

calculate, with the server associated with the promotion service, i, the current consumer demand for one or more promotions in the geographical area based on virtual offers, the current consumer demand comprising one or more promotions and a demanded quantity of at least a portion of the one or more promotions;

identify one or more providers in the geographical area that are identified as able to supply at least a portion of the current consumer demand for the one or more promotions, thereby identifying the one or more provider as one or more sales leads;

in response to the identification of the one or more sales leads, transmit, over a network, a notification to the sales resource device, wherein the notification causes the graphical user interface to display provider information for each of the one or more sales leads, the provider information comprising, for each sales lead, a provider location indication, a promotion indication of a good or service, and a promotion quantity suggested for each of the providers based on the current consumer demand, a promotion provider identified as a competitor, and a sales status of the sales lead indicating a last communication with the sales lead by any of a plurality of sales resources devices operative in the network;

further responsive to the receipt of the real-time detected location of the sales resource device, provide a list of the one or more providers, via the graphical user interface in an order of proximity to the sales resource device; and for each of the one or more sales leads, calculate a probability of closing an agreement between the promotion service and the respective provider for the promotion service to offer the promotion for the good or service on behalf of the respective provider;

generate, by the server, a next provider indication, and cause display thereof via the graphical user interface, wherein the next provider indication provides the sales resource device with a suggested next provider of the one or more providers to visit next based at least in part on proximity of the sales resource device to the suggested next provider in the geographical area; and cause the probability of closing the agreement to be displayed via the graphical user interface.

13. The computer program product according to claim 12, wherein the computer-executable program code instructions further comprise program code instructions to:

receive a sale indication via the sales resource device, the sale indication relating to closing the agreement between the promotion service and the respective provider for the promotion service to offer the promotion for the good or service on behalf of the respective provider; and in response to receiving the sale indication, update the current consumer demand on the promotional system.

14. The computer program product according to claim 12, wherein the provider information further comprises an ownership indicator identifying a sales resource associated with the provider.

15. The computer program product according to claim 12, wherein the provider information further comprises activity history indicating a particular sales resource having interacted with the provider.

16. The computer program product according to claim 12, wherein the provider information further comprises competitive promotion information associated with a promotion provider identified as the competitor, a competitive promotion information comprising at least a promotion cost and value, and units sold.

* * * * *

UNITED STATES PATENT AND TRADEMARK OFFICE
CERTIFICATE OF CORRECTION

| | | |
|---|---|---|
| PATENT NO. | : 12,026,733 B2 | Page 1 of 1 |
| APPLICATION NO. | : 17/521036 | |
| DATED | : July 2, 2024 | |
| INVENTOR(S) | : Marcus Sacco et al. | |

It is certified that error appears in the above-identified patent and that said Letters Patent is hereby corrected as shown below:

In the Claims

In Column 28, Line 2, Claim 12, delete "i, the" and insert -- the --, therefor.

Signed and Sealed this
Third Day of December, 2024

Katherine Kelly Vidal
*Director of the United States Patent and Trademark Office*